United States Patent [19]

Takahashi et al.

[11] Patent Number: 5,793,891
[45] Date of Patent: Aug. 11, 1998

[54] ADAPTIVE TRAINING METHOD FOR PATTERN RECOGNITION

[75] Inventors: Junichi Takahashi, Sagamihara; Shigeki Sagayama, Hoya, both of Japan

[73] Assignee: Nippon Telegraph and Telephone Corporation, Tokyo, Japan

[21] Appl. No.: 498,264

[22] Filed: Jul. 3, 1995

[30] Foreign Application Priority Data

Jul. 7, 1994 [JP] Japan ................................. 6-156238
Sep. 21, 1994 [JP] Japan ................................. 6-226505

[51] Int. Cl.⁶ .............................. G06K 9/62; G06K 9/74; G10L 3/02
[52] U.S. Cl. ............................... 382/228; 382/156; 382/159; 395/211
[58] Field of Search ...................... 382/228, 229, 382/156, 159, 160; 381/43; 395/2.11, 2, 2.68

[56] References Cited

U.S. PATENT DOCUMENTS

| | | | |
|---|---|---|---|
| 4,741,036 | 4/1988 | Bahl et al. | 381/43 |
| 5,129,001 | 7/1992 | Bahl et al. | 382/43 |
| 5,129,002 | 7/1992 | Tsuboka | 381/43 |
| 5,497,447 | 3/1996 | Bahl et al. | 395/2.54 |
| 5,544,257 | 8/1996 | Bellegarda et al. | 382/228 |

*Primary Examiner*—Andrew W. Johns
*Assistant Examiner*—Monica S. Davis
*Attorney, Agent, or Firm*—Pollock, Vande Sande & Priddy

[57] ABSTRACT

Training data is LPC analyzed to obtain a feature parameter vector sequence, which is subjected to Viterbi segmentation using reference phoneme models to separate phonemes. Each piece of phoneme data is used to estimate a mean vector of the corresponding reference phoneme model by a maximum a posteriori estimation method. The adapted phoneme model and the corresponding reference phoneme model are used to estimate a mean vector for an unadapted phoneme model through interpolation by a vector field smoothing method. Alternatively, the mean vector of the adapted phoneme model is further smoothed by the vector field smoothing method. By this, an adapted model is obtained which has, as its parameters, the mean vector obtained for each phoneme and other corresponding parameters.

37 Claims, 11 Drawing Sheets

ADAPTIVE TRAINING METHOD FOR PATTERN RECOGNITION

BACKGROUND OF THE INVENTION

The present invention relates to an adaptive training method which is applied to pattern recognition that recognizes the pattern of an input signal, such as speech, character or graphic form, by comparing the pattern of its feature data sequence with a model and which uses a prepared reference model as an initial model and corrects it through training with training data to adapt to the property of the training data.

A Hidden Markov Model method (hereinafter referred to as the HMM method), which models a feature data sequence of an object of recognition on the basis of a stochastic statistical theory, is useful in pattern recognition of speech, character and graphic form. In the field of speech recognition, in particular, the HMM method is currently in the mainstream. The HMM method is described in detail, for example, in Seiichi Nakagawa, "Speech Recognition with Probability Models," edited by Institute of Electronics, Information and Communication Engineers of Japan. It is no exaggeration to say that techniques related to the HMM method have advanced with the progress of speech recognition technology; namely, techniques using various HMMs have been and are now being studied for further development, and it might be said that the HMM techniques in the field of speech recognition technology substantially covers ordinary pattern recognition technology using conventional hidden Markov models.

A description will be given, with reference to FIG. 1, of a prior art procedure for speech recognition through the use of the HMM method. The processing of the HMM method consists of two phases: "training" and "search." In the "training" phase, switches 10 and 11 in FIG. 1 respectively select the side A to connect a speech database 12 and a training part 13 to an analysis part 14; data of the speech database 12, wherein there are prestored pieces of speech sample data in the form of phonemes, syllables, words, and sentences of various speeches, are used to calculate models representing acoustic properties of each phoneme, each syllable and each word on the basis of training algorithms of the HMM method. The signal that is used in the process of obtaining the models is a time sequence of vector data of feature parameters extracted from speech signals in the analysis part 14. This process is illustrated by the input of speech signal data into the analysis part 14 from the speech database 12 and the output from the analysis part 14, that is, the input of feature parameter data of the speech signal data from the speech database 12 into the training part 13.

In FIG. 1, the arrow directed to the training part 13 from an HMM set 15 which stores models finally obtained through training indicates that model configurations of the HMMs to be trained (such as the number of states and the type of inter-state transition) and initial values of model parameters (state transition probability, symbol output probability, initial state probability) are set at the time of training. It is Linear Predictive Coding (hereinafter referred to as LPC) analysis that is often used as signal processing in the analysis part 14, and feature parameters that are used are LPC cepstrum, LPC delta cepstrum, Mel cepstrum and logarithmic power. Models of a phoneme, a syllable and so on obtained by such training are stored as elements of the HMM set 15; the HMM set 15 represents acoustical properties of all speech samples stored in the speech database 12. Incidentally, a Baum-Welch re-estimation scheme based on the maximum likelihood estimation is often used as a training algorithm.

In the phase of "search," the switches 10 and 11 in FIG. 1 respectively select the side B to connect an unknown speech input part 16 and a search part 17 to the analysis part 14. An unknown input speech signal is converted into a series of feature parameter vector data through the analysis part 14; in the search processing part 17, by using models of the HMM set 15, likelihood scores are calculated for said series of feature parameter vector data; and the model which gives the maximum value of likelihood is selected as the recognition result. As search algorithms of the HMM method for calculating the likelihood, a trellis calculation based on a forward-backward algorithm and a Viterbi algorithm are often used. In the case of word recognition, when models are each represented by a sequence of phonemes or syllables, a model for the word that is the object of recognition is produced by a concatenation of the above-mentioned phoneme models in accordance with the transcription (a sequence of phonemes, for instance) of the word, and the likelihood is calculated for each word model thus obtained. The likelihoods of respective word models are compared in terms of likelihood value and the word that provides the maximum likelihood is obtained as the result of recognition.

Accordingly, speech recognition by the HMM method requires for acquiring a large amount of speech data training as information for the speech signal that is the object of recognition. There have been proposed so far various speech databases, which are mostly high-quality speech databases.

From the viewpoint of applications of speech recognition to actual service, the use of speech in real environments is natural; hence, there is an eager demand for recognition technology for speeches that are uttered in real use environments. The most important problem in speech recognition in real environments is how to overcome degradation of the speech quality which is caused by speech transmitting means and variations in personal features of speakers which are conspicuous in their speeches—this is essential to accurate recognition of speeches of an unspecified number of speakers in actual environments. The factors that are considered to cause the degradation of the speech quality by the speech transmitting means (a telephone network, for instance) are various noises, various frequency band limitations and various transmission loss characteristics and frequency characteristics, and serious degradation of the speech quality under the influence of such factors results in a substantial reduction in the speech recognition rate. Moreover, since speeches of an unspecified number of speakers has large variabilities in personal features, there is not yet available satisfactory speech recognition performance high enough to meet requirements for practical use; the performance is appreciably lower than speaker-dependent speech recognition rate. Besides, in the application of speech recognition to reservation, information telephone services, the influence of the speech transmission system and an unspecified number of service users are preconditions therefor; hence, it is necessary to cope with both the influence of the transmission system characteristics and the variations in personal features.

In view of the framework of the HMM method described above, it seems that the above-mentioned problems could be settled through training with speech data containing all transmission system characteristics and speech data containing all personal features. However, it is an extremely time- and labor-consuming task to acquire or collect speech data containing as many transmission system characteristics and personal features as possible and store them as a database, and it is hard in the real world to acquire all possible combinations of them. Furthermore, it is expected that speech undergoes a substantial variation under the influence of these factors and that even a model trained with speech data containing a wide variety of variations cannot sufficiently represent the substantial variation and hence cannot provide satisfactory speech recognition performance.

One possible method that has been proposed to cope with such a problem is an "adaptation" scheme in which models trained with high-quality speech data are adapted to facilitate representing speech deteriorated by various factors in real use environments or speech containing personal features of a speaker who uses a speech recognition system. This scheme is advantageous in that a large amount of speech data need not be collected in actual use environments. However, in order to adapt the prepared speech models for the speech models of the actual environments, it is necessary to immediately acquire the speech contaminated by the factors of actual environments, such as characteristics of transmission media and personal features of speakers, prior to the recognition processing. And the parameters of reference models should be adjusted through conventional training such as maximum likelihood estimation using the acquired data.

In the application of such a method to the actual system or service, it is indispensable to ask users to utter speech data necessary for training for adaptation of models; namely, the users are forced to make extra utterances when they use the speech recognition function of the system. Therefore, to keep the user interface with the system (or a man-machine interface) as comfortable as possible, it is desired to minimize the number of utterances of the above-mentioned training data or the time therefor (two to three words, for instance).

Conventionally, the training for the adaptation of models (hereinafter referred to as adaptation training) is carried out, for example, by a method using codebook mapping or a method in which the adaptation training is regarded as a small-amount-of-data training problem and models of speeches (such as phonemes) which are not contained in a small amount of training data are estimated through interpolation with speech models training with the small amount of training data. The method by codebook mapping is based on a method which utilizes a vector quantization technique to represent features of acoustic space by a codebook composed of a plurality of representative code spectra indicative of features of speech. This method performs adaptation by estimating the correspondence between a reference codebook prepared in advance and a codebook for the speech to be adapted. This technology is disclosed, for example, in R. Schwartz, Y. Chow and F. Kubala, "Rapid Speaker Adaptation Using Probabilistic Mapping," Proceedings of ICASSP-87, 15.3, pp. 633–639, (1987-4) and K. Shikano, S. Nakamura and M. Abe, "Speaker Adaptation and Voice Conversion by Codebook Mapping," Proceedings of ISCAS-91 (1991-6). This method requires adaptation training data of at least tens of words for generating a codebook which is capable of sufficiently representing the acoustic space of the speech to be adapted and, as referred to previously, the practical application of this method poses problems from the viewpoints of the acquisition of adaptation training data and the man-machine interface in training.

As a method which regards the adaptation training as a small-amount-of-data training problem and performs the adaptation training by interpolation, there is proposed, for example, a Vector Field Transfer Smoothing (VFS) scheme.

This technique is disclosed, for example, in Kazumi Ohkura, Masahide Sugiyama and Shigeki Sagayama, "SPEAKER ADAPTATION BASED ON TRANSFER VECTOR FIELD SMOOTHING WITH CONTINUOUS MIXTURE DENSITY HMMs," Journal of the Institute of Electronics, Information and Communication Engineers of Japan D-II, Vol. J76-D-II, No. 12, pp. 2469–2476 (1993-12). With this method, models obtained through training with speeches (phonemes) contained in a small amount of training data are used to estimate, by interpolation or extrapolation, speech models which are not contained in the training data. However, adaptation training data of at least tens of words or about 10 sentences is needed to obtain sufficient recognition performance—this presents a problem in the acquisition of adaptation training data.

SUMMARY OF THE INVENTION

It is therefore an object of the present invention to provide an adaptive training method which permits substantial reduction of such a burden on users as forced utterances for the acquisition of adaptation training data and attains high recognition performance through adaptation training with a minimum amount of training data and through fast adaptation.

A method of training the adapted models for pattern recognition according to a first aspect of the present invention comprises the steps:

(a) wherein, from reference models of training objects in a set corresponding to training models in input training data, a first group of adapted models are obtained through adaptation of the reference models by a maximum a posteriori estimation scheme using the training data;

(b) wherein, letting the reference models in the set corresponding to the first group of adapted models being identified as a first group of reference models and other reference models in the set as a second group of reference models, the relationship between the first group of adapted models and the corresponding first group of reference models is used to obtain a second group of adapted models corresponding to the second group of reference models through interpolation processing based on the use of a vector field smoothing scheme; and (c) wherein the second group of adapted models obtained by the interpolation processing and the first group of adapted models obtained by the maximum a posteriori estimation scheme are combined into a set of adapted models for pattern recognition.

In the method according to the first aspect of the invention, the first group of adapted models obtained by the maximum a posteriori estimation in step (a) is modified into a third group of adapted models through smoothing by the vector field smoothing scheme. The third group of adapted models thus obtained are used as the first group of adapted models corresponding to the first group of reference models and combined with the second group of adapted models into the set of adapted models for pattern recognition in the step (c).

In a method according to a second aspect of the present invention, the sequence of steps (d) through (f) listed below are repeated upon each input of new training data after step (c) in the method of the first aspect.

(d) Those adapted models of training objects in the above-mentioned set of adapted models which correspond to training models in the new training data are re-adapted by the maximum a posteriori estimation to the new training data and the thus obtained re-adapted models are added to the above-said first group.

(e) Letting reference models in the set corresponding to the adapted models of the first group be identified as a first group of reference models and other reference models in the set be identified as a second group of reference models, the relationship between the first group of adapted models and the first group of reference models corresponding thereto is used to obtain a second group of adapted models corresponding to the second group of reference models through interpolation based on the vector field smoothing scheme.

(f) The first group of adapted models obtained by the maximum a posteriori estimation in step (d) and the second group of adapted models obtained by the interpolation in step (e) are combined into a set of updated adapted models for pattern recognition.

A method according to a third aspect of the present invention repeats the following sequence of steps (d) through (f) upon each input of new training data after step (c) in the method of the first aspect.

(d) The above set of adapted models is regarded as a set of updated reference models, and those of the updated reference models which correspond to the new training data are re-adapted by the maximum a posteriori estimation through the use of the new training data, thereby updating the adapted models of the first group.

(e) Letting the updated reference models in the above set corresponding to the adapted models of the first group be identified as a first group of updated reference models and other reference models in the set be identified as a second group of updated reference models, the relationship between the first group of adapted models and the first group of updated reference models corresponding thereto is used to obtain a second group of adapted models corresponding to the second group of updated reference models by interpolation based on the vector field smoothing method.

(f) The first group of adapted models obtained by the maximum a posteriori estimation in step (d) and the second group of adapted models obtained by the interpolation in step (e) are combined into a set of updated adapted models for pattern recognition.

In a method according to a fourth aspect of the present invention, step (c) in the method of the first aspect includes a step wherein the first group of adapted models are used to update the reference models of an initial set corresponding thereto to generate a set of partially updated reference models, and the following sequence of steps (d) through (f) are repeated upon each input of new training data after step (c).

(d) The above-mentioned set of adapted models is regarded as a set of updated reference models, and those of the updated reference models of the set which correspond to the new training data are adapted using the new training data by the maximum a posteriori estimation to obtain adapted models, with which the adapted models of the first group are updated.

(e) Letting those of the partially updated reference models in the above-mentioned set which correspond to the first group of adapted models be identified as a first group of partially updated reference models and the other partially updated reference models in the set be identified as a second group of partially updated reference models, the relationship between the first group of adapted models and the first group of partially updated reference models corresponding thereto is used to obtain a second group of adapted models corresponding to the second group of partially updated reference models through interpolation based on the vector field smoothing method.

(f) The first group of adapted models updated in step (d) are used to update those of the partially updated reference models in the set which correspond to them, and the first group of adapted models obtained by the maximum a posteriori estimation and the second group of adapted models obtained by the interpolation procedure in step (e) are combined into a set of updated adapted models for pattern recognition.

In the methods according to the second through fourth aspects of the invention, the first group of adapted models obtained by the maximum a posteriori estimation in step (d) is modified through smoothing by the vector field smoothing method in step (f), and the modified adapted models are combined, as the first group of adapted models, with the second group of adapted models into a set of adapted models for pattern recognition.

In a method according to a fifth aspect of the present invention, step (c) in the method of the first aspect includes a step wherein the first group of adapted models are used to update the reference models of an initial set corresponding thereto to generate a set of partially updated reference models, and the following steps (d) through (f) are repeated upon each input of new training data after step (c).

(d) The reference models of training objects in the set of partially updated reference models which correspond to the new training data are adapted using the new training data through the maximum a posteriori estimation to obtain adapted models, and the adapted models are added to the first group of adapted models and the reference models of training objects in the set of partially updated reference models are updated.

(e) Letting those of the reference models in the above-mentioned initial set which correspond to the first group of adapted models be identified as a first group of reference models and the other reference models in the initial set be identified as a second group of reference models, the relationship between the first group of adapted models and the corresponding first group of reference models is used to obtain a second group of adapted models corresponding to the second group of reference models through interpolation based on the vector field smoothing method.

(f) The first group of adapted models obtained by the maximum a posteriori estimation in step (d) and the second group of adapted models obtained by the interpolation procedure in step (e) are combined into a set of updated adapted models for pattern recognition.

In a method according to a sixth aspect of the present invention, step (c) in the method of the first aspect includes a step wherein the first group of adapted models are used to update the initial set of reference models corresponding thereto to generate a set of partially updated reference models, and the following steps (d) through (f) are repeated upon each input of new training data after step (c).

(d) The above-mentioned set of adapted models is regarded as a set of updated reference models, and the reference models are updated to obtain a set of updated reference models. Then, those partially updated reference models of training objects in the above-mentioned set of partially updated reference models, which correspond to the new training data, are adapted using the new training data by the maximum a posteriori estimation to obtain adapted models, with which the first group of adapted models and the reference models of the training objects in the partially updated reference models are updated.

(e) Letting those of the updated reference models in the above-mentioned set which correspond to the first group of adapted models be identified as a first group of updated reference models and the other updated reference models in the set be identified as a second group of updated reference models, the relationship between the first group of adapted models and the first group of updated reference models corresponding thereto is used to obtain a second group of adapted models corresponding to the second group of updated reference models through interpolation based on the vector field smoothing method.

(f) The first group of adapted models obtained by the maximum a posteriori estimation in step (d) and the second group of adapted models obtained by the interpolation procedure in step (e) are combined into a set of updated adapted models for pattern recognition.

In a method according to a seventh aspect of the present invention, step (c) in the method of the first aspect includes a step wherein the first group of adapted models are used to update the initial set of reference models corresponding thereto to generate a set of partially updated reference models, and the following steps (d) through (f) are repeated upon each input of new training data after step (c).

(d) The reference models of training objects in the set of partially updated reference models which correspond to the new training data are adapted using the training data by the maximum a posteriori estimation to obtain adapted models, with which the first group of adapted models are updated.

(e) Letting the reference models in the set of partially updated reference models, which correspond to the first group of adapted models, be identified as a first group of partially updated reference models and the other reference models in the set be identified as a second group of partially updated reference models, the relationship between the first group of the adapted models and the first group of partially updated reference models corresponding thereto is used to obtain a second group of adapted models corresponding to the second group of partially updated reference models through interpolation based on the vector field smoothing method.

(f) The first group of adapted models obtained in step (d) are used to update the corresponding reference models of training objects in the set of partially updated reference models, and the first group of adapted models obtained by the maximum a posteriori estimation in step (d) and the second group of adapted models obtained by the interpolation procedure in step (e) are combined into a set of updated adapted models for pattern recognition.

In the methods according to the fifth through seventh aspects of the invention, in step (f), the reference models of training objects in the set of partially updated reference models are updated with the first group of adapted models obtained by the maximum a posteriori estimation in step (d). The first group of adapted models obtained in step (d) are modified through the smoothing procedure by the vector field smoothing method to form a third group of adapted models, which are combined, as the first group of adapted models, with the second group of adapted models into a set of adapted models for pattern recognition.

According to the first aspect of the present invention, since the input training data is used for the adaptation of the corresponding reference models by the maximum a posteriori estimation, the adaptation can be achieved with high accuracy even with a small amount of training data. This is based on the feature of the maximum a posteriori estimation scheme that models, which are obtained from initial models through training using newly obtained adaptation training data, are nearly equivalent to models which are obtained through pooled training by a conventional maximum likelihood estimation scheme (ML estimation scheme) using both the training data for the initial models and the new adaptation training data. Moreover, since interpolation of untrained reference models and smoothing of the trained reference models by the maximum a posteriori estimation to compensate for estimation errors are achieved by the vector field smoothing scheme, adaptation from a reference model set to a speaker-specific model set can be carried out with a small amount of input training data.

According to the second through seventh aspects of the present invention, incremental adaptation training is carried out for each adaptation training data by the combination of the maximum a posteriori estimation and the vector field smoothing scheme. Moreover, these methods feature training which has combined prior knowledge contained in model parameters of reference models and new adaptation training data. And these methods permit training of all phoneme models at all times by an advantage of an additional training function that training can be carried out only with new training data with no use of original training data for reference model training, which is a feature of the maximum a posteriori estimation, and by the estimation of phoneme models not contained in adaptation data through interpolation and the correction of estimation errors of phoneme models trained with adaptation training data, which is a feature of the vector field smoothing scheme.

DESCRIPTION OF THE PREFERRED EMBODIMENTS

With the present speech recognition technology, it is in the mainstream in speech pattern recognition to use models of phonemes which are units or components of speech; hence, phonemes will be regarded as units of speech models in the following description.

Figure 1:
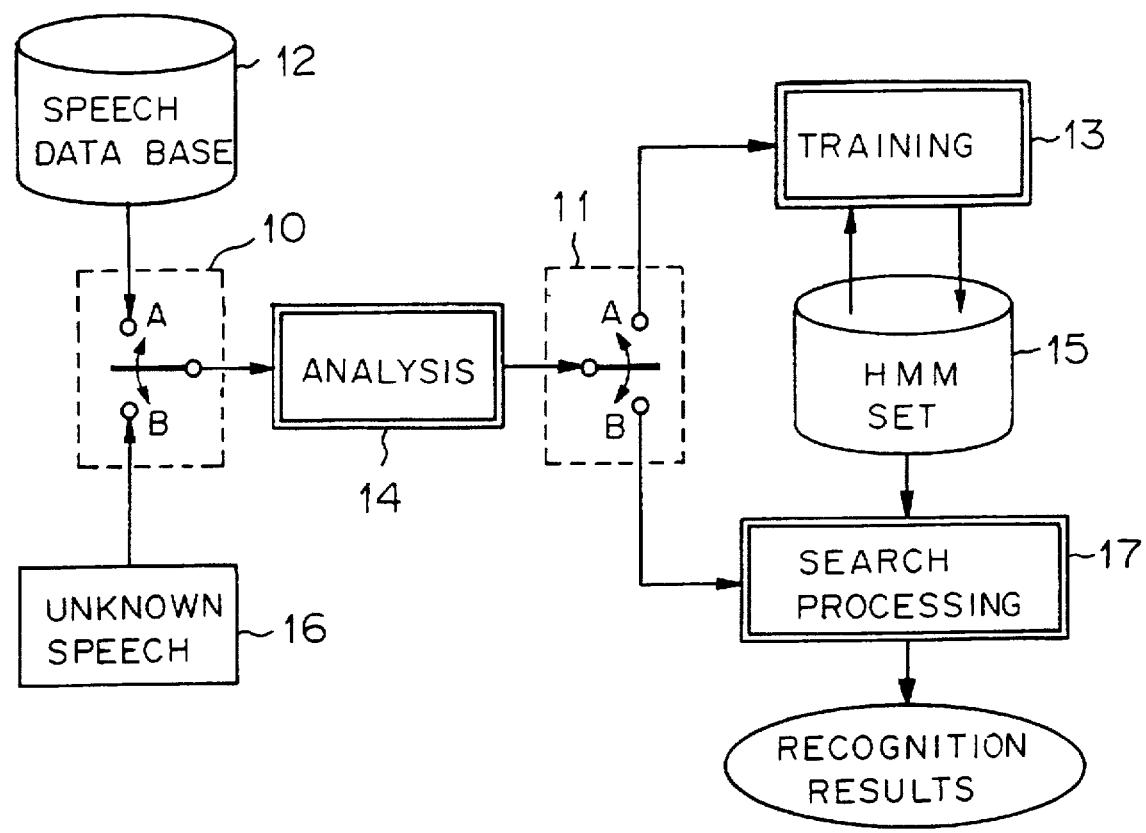
FIG. 1 is a block diagram showing a prior art speech recognition procedure based on the HMM method which is the most popular algorithm for speech recognition at present.
Figure 2:
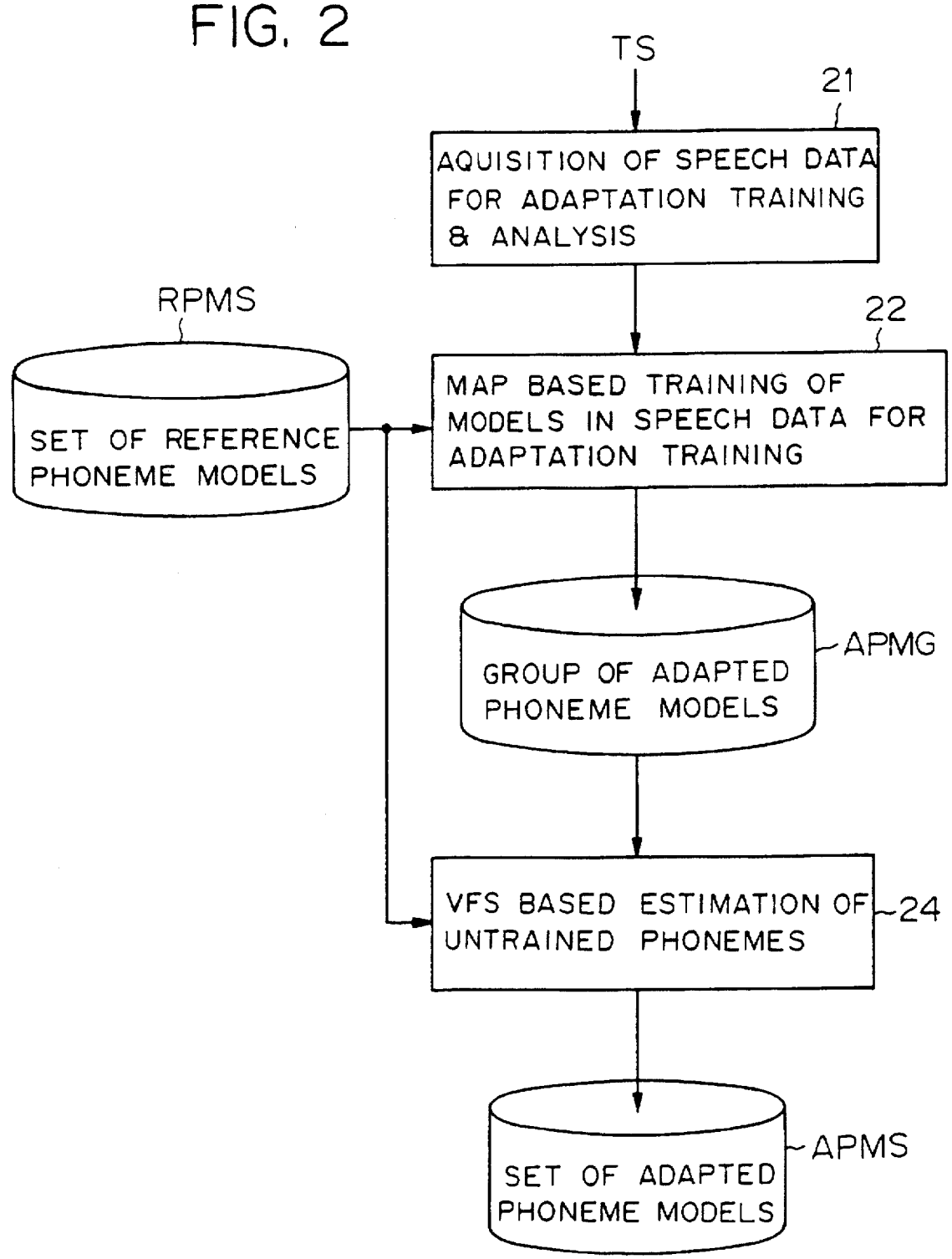
FIG. 2 is a flowchart showing the basic procedure in the method of the present invention.

FIG. 2 shows the procedure for speech recognition according to the present invention. This procedure includes two principal processes. A first one of them is an adaptation training process 22. In process 22, a set RPMS of models of reference phonemes (hereinafter referred to as reference phoneme models and identified by RPM) is used as a set of initial models, and those phoneme models in the reference phoneme model set RPMS which are to be adapted are trained using speech data TS of the known training words acquired in a process 21. The phoneme models that are trained here are limited to phonemes present in the training speech data TS. In process 21, the acquired speech data TS is converted into a vector data time sequence of speech feature parameters for use in adaptation training in and after process 22. In the following description, the vector data sequence of the training speech data TS will be referred to as training data and identified by TD. The present invention features the use of the Maximum A Posteriori Estimation (MAP estimation) algorithm for the adaptation training. The maximum a posteriori estimation algorithm is disclosed, for example, in Jean-Luc Gauvain and Chin-Hui Lee, "Baysian Learning for Hidden Markov Model with Gaussian Mixture State Observation Densities," Speech Communication, Vol. 11, Nos. 2–3, pp. 205–213 (1992) and Chin-Hui Lee and Jean-Luc Gauvain, "Speaker Adaptation Based on MAP Estimation of HMM parameters," Proceedings of ICASSP-93, pp. II-589–591, (1993).

The aforementioned conventional adaptation method employs the Maximum Likelihood Estimation (ML estimation) algorithm for the adaptation training and performs training of models through estimation by the Baum-Welch algorithm. With the estimation by the Baum-Welch algorithm, each phoneme model in the training speech is adapted so that the likelihood becomes maximum; hence, this method poses a fundamental problem that no high estimation accuracy can be achieved in the training of one phoneme unless a large amount of speech data containing a wide variations corresponding to the phoneme is used. Accordingly, in the adaptation processing based on the premise that only a limited amount of adaptation training data can be used, even if some phoneme models are trained with adaptation training data, the amounts of training data for such phonemes in the training data are too small to provide sufficiently high estimation accuracy for the phoneme models themselves. Moreover, since phoneme models not contained in the adaptation training data are estimated through interpolation by the use of trained phoneme models, it is hard to ensure sufficiently high estimation accuracy for them. For such reasons as mentioned above, the conventional adaptation procedure needs to secure such an amount of adaptation training data as to obtain permissible model estimation accuracy and requires an amount of data about tens of words.

With the present invention, however, the estimation accuracy in the training with a small amount of training speech data TS can be increased by the use of the maximum a posteriori estimation method with which it is possible to secure the estimation accuracy only by using one piece of vector data in the time sequence of speech feature parameters. The maximum a posteriori estimation method produces models by integrating prior knowledge of reference phoneme models RPM and training data, and hence permits fast adaptation training with the amount of adaptation training data reduced down to several words from tens of words needed in the past. By the training with the maximum a posteriori estimation method in the process 22, the reference phoneme models RPM corresponding to phonemes contained in the training speech data TS are adapted to obtain a set TPMS of adapted phoneme models $APM_A$.

The other important process is a process 24 of estimating adapted models of the untrained phoneme models. In this process, adapted phoneme models corresponding to untrained phoneme models in the set RPMS of pre-acquired reference phoneme models are estimated through interpolation, using the phoneme models $APM_A$ trained in the process 22 and the reference phoneme models RPM. The present invention has its feature in that this process is performed using the interpolation and smoothing procedures such as in the aforementioned vector field smoothing method (VFS). In the interpolation procedure by the vector field smoothing method, the phoneme models $APM_A$ trained by the maximum a posteriori estimation are regarded as models which have transferred, by the adaptation training, through the acoustic space from the reference phoneme models corresponding to the phonemes concerned, and the transfer vectors between the respective phoneme models are assumed to be directed in about the same direction. The transfer vectors for untrained phoneme models RPM in the reference phoneme model set RPMS are obtained, through an interpolation procedure using the transfer vectors for adapted phoneme models $APM_A$ obtained by adaptation training, and the thus obtained transfer vectors are added to reference models of untrained phonemes to thereby estimate adapted models. The adapted phoneme models thus obtained with the processes 22 and 24 are held as an adapted model set APMS for all the reference phoneme models that are considered as targets.

That is, with the combination of the adaptation training by the maximum a posteriori estimation method, both of the estimation of untrained models and the smoothing of trained models by the vector field smoothing method, the present invention permits high-estimation-accuracy adaptation training with a small amount of training speech data, the estimation of untrained models through a simple interpolation or smoothing procedure using the trained models and the modification of already adapted models with high accuracy, and hence allows the implementation of fast and high-performance adaptation. For unknown speech that is uttered by a specified speaker who uttered the speech of the input speech data TS, it is decided, for example, by the Viterbi algorithm, which model in the adapted phoneme model set APMS the feature parameter vector sequence of the unknown speech yields the closest similarity to; by this, the input speech is recognized.

The following will describe the application of this invention method to the speaker adaptation in which reference phoneme models are adapted to speaker-specific phoneme models, while at the same time showing examples of concrete HMM parameter calculations for the adaptation training of phoneme models and the interpolation and smoothing procedures.

In practical applications of the present invention, the reference phoneme models are usually trained using speech data uttered by young and old speakers of both sexes which were previously stored and the obtained models are used as speaker-independent models for the recognition. A specific speaker herein mentioned is a speaker who sometimes uses the speech recognition system or speech recognition function.

Figure 3:
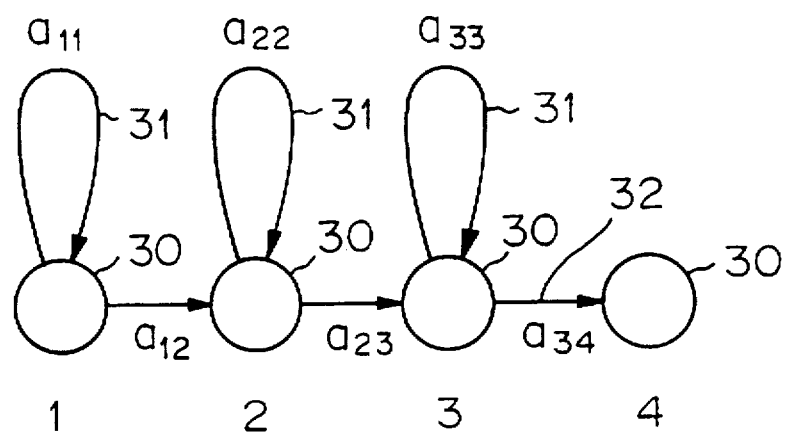
FIG. 3 is a diagram showing the model structure which is usually employed in the HMM method.

In the following description, an HMM model of each phoneme is assumed to be a 4-state and 3-mixture, left-toright continuous mixture HMM as shown in FIG. 3. In FIG. 3, the white circles each represent a state 30 and the numbers written under them are state numbers assigned to respective states. The arrows between the states indicate state transition branches, which are classified into self-loops 31 for the transition of the same state and transition branches 32 for the transition to the right side state. The parameter $a_{ij}$ written near each state transition branch represents the state transition probability from a state i to another state j. The state of the state number 4 is the final state of the phoneme model. In the case of formulating a model of a syllable, word or sentence by concatenating respective phoneme models, the final state 4 is concatenated to the state number 1 of the subsequent phoneme model. This left-to-right structured model features the self-loop and the state transition only to the state on the right, and this model is often used as a model that well represents speech phenomena. The continuous mixture mentioned above means the representation of the output density distribution function of each state by the linear addition of a plurality of Gaussian distributions (or normal distributions); this is a dominating model representation scheme in the present speech recognition algorithms.

The HMM parameters of each phoneme are defined below in accordance with the model structure depicted in FIG. 3.

State transition probability:

$a_{ij}$; (i,j)=(1,1), (1,2), (2,2), (2,3), (3,3), (3,4)

Output density:

$$b_j(x) = \sum_{k=1}^{3} w_{jk} N(x|\mu_{jk}, \sigma_{jk}); j = 1, 2, 3 \quad (1)$$

where the function $N(x|\mu_{jk},\sigma_{jk})$ indicates a Gaussian distribution function and the coefficient $w_{jk}$ a weighting coefficient. The Gaussian distribution function is expressed by the following equation:

$$N(x|\mu_{jk},\sigma_{jk}) = \{(2\pi)^n|\sigma_{jk}|\}^{-\frac{1}{2}} \exp\{-(\frac{1}{2})(x-\mu_{jk})^t \sigma_{jk}^{-1}(x-\mu_{jk})\} \quad (2)$$

where t indicates a transposition, x vector data at a certain time in the time sequence of vector data of speech feature parameters, and $\mu_{jk}$ and $\sigma_{jk}$ parameters of the Gaussian distribution function, which are a mean vector and a covariance matrix.

Based on the above definitions, a flowchart of this embodiment shown in FIG. 4 will be described. A description will be given first for the adaptation training procedure using the maximum a posteriori (MAP) estimation which is one of the features of the present invention. Now, it is assumed that speech samples of two predetermined Japanese words "urayamashii" and "omoshiroi" which means "enviable" and "interesting" could be acquired as the training speech data TS. The phonemic symbol sequences of the two words are assumed to be transcribed, for example, "#_u_r_a_y_a_m_a_sh_ii_190 " and "o_m_o_sh_i_r_o_i_#", where "_" is a delimiter between adjacent phonemic symbols and "#" is a phonemic symbol corresponding to a part for a silent duration over which no speech is uttered. This silent duration immediately precedes and follows the utterance of each word in a sequence of speech signals. And, "a", "u", "o", "m", "sh", "ii", "r" and so forth, expressed by the alphabets, are phonemic transcriptions of vowels and consonants. In the examples of this speech data, there are contained 10 kinds of phonemes "#", "u", "r", "a", "y", "m", "sh", "ii", "o" and "i". The training speech data TS of these two words is, for example, LPC-analyzed in step 41 for transformation into a time sequence of feature parameter vectors $x_1, x_2, x_3, \ldots$ which are used as training data TD.

On the other hand, in the set RPMS of reference phoneme models RPM prepared in advance, there are contained models RPM corresponding to all phonemes (including, for example, vowels such as "e", "ai" and "uu" and consonants such as "k", "t", "p", "ch" and "by" in addition to the above-mentioned phonemes), and the above-mentioned 10 phonemes correspond to a subset in the set RPMS. In this reference phoneme model set RPMS, each phoneme model is represented by the left-to-right type continuous mixture HMM defined previously. Since the 10 kinds of phonemes are contained in the acquired speech data TS of the two words, the adaptation training is carried out for those models in the reference phoneme model set RPMS which correspond to the 10 kinds of phonemes. Since the adaptation training of each phoneme model requires a speech signal corresponding to each phoneme, it is necessary to detect in advance which duration in the acquired speech signal of each word (the feature parameter vector sequence) corresponds to which phoneme. The correspondence between the phoneme and the duration of the speech signal can be detected, for example, by the Viterbi algorithm which is often used as an algorithm for the search procedure of the HMM method. This process is called a Viterbi segmentation 42. In this procedure, the speech data which is the object of segmentation (the training data TD transformed into the time sequence of feature parameter vector data $x_1, x_2, \ldots$ in the analysis step 41) is regarded to correspond to a model created by the concatenation of phoneme models according to its uttered contents, that is, the phoneme sequence of that word, and the correspondence between speech signal periods of the training data and each phoneme model is determined under the condition of maximizing the likelihood (a kind of score representing similarity) for the training data TD. The phoneme models for use in this case are those in the reference phoneme model set RPMS which are contained in the speech data to be segmented, and the training words are predetermined.

Figure 5:
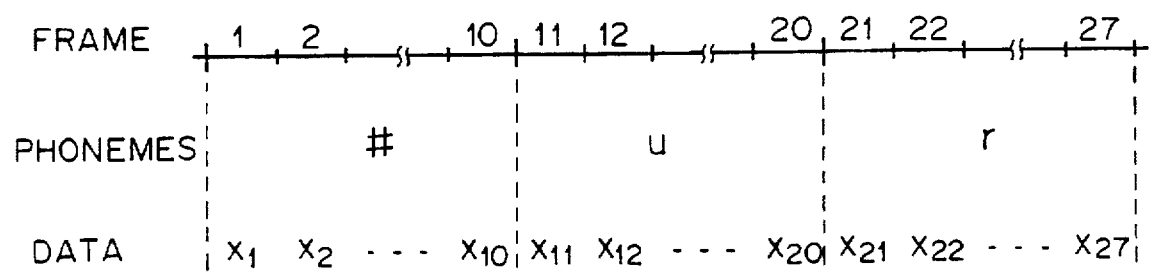
FIG. 5 is a diagram showing the relationship between phonemes and training data frames.

Let the feature parameter vector data time-sequence of the speech data of the word "urayamashii" be represented by $D_1=\{x_1, x_2, \ldots, x_t, \ldots, x_{T1}\}$, where t indicates time and is called a frame. That is, in this example, the total frame length of the speech data TS of the word "urayamashii" is T1, and the feature parameter in the t-th frame is $x_t$. Assuming that the speech signal periods of the speech data TS corresponding to the first three phonemes of the word, "#", "u" and "r", are segmented into frame periods from first to 10th frame, from 11th to 20th frame and from 21st to 27th frame as shown in FIG. 5, the three kinds of phoneme models use, as the training data TD, feature parameter vector sequences of the speech data in the respective frame periods. For other phonemes contained in the word "urayamashii" and the phonemes in the other word "omoshiroi," speech signal periods are similarly segmented and the speech signal periods corresponding to the respective phonemes are used for the adaptation training of models. Incidentally, for the phonemes contained in two kinds of words, all of the speech signal periods of each word corresponding to the phoneme are used for adaptation training.

Once the phonemes contained in the training data TD and the speech signal periods corresponding to the phonemes are determined as described above, the process goes to step 43, in which those phoneme models RPM in the reference phoneme model set RPMS which correspond to the phonemes contained in the speech data for adaptation training are trained for adaptation by the maximum a posteriori estimation method using the speech signal periods corresponding to the phonemes contained in the training data TD.

The principle of the maximum a posteriori estimation method will briefly be described in comparison with the maximum likelihood estimation method (the ML estimation method) which has been widely used in the past. On the assumption that a model parameter θ to be estimated is unknown, that is, a constant unrelated to past (preknown) models, the maximum likelihood estimation method estimates the model parameter so that the likelihood of the model for the actually observed sample data value x becomes maximum. Letting the likelihood of the model be represented by a function f(x|θ) which indicates the conditional probability of observing the sample value x under the model parameter θ that is to be estimated, an estimated value $\theta_{ML}$ of the model parameter is given by the following equation:

$$\theta_{ML} = \text{argmax } f(x|\theta) \tag{3}$$

where argmax means that the parameter θ which maximizes the function f by changing the parameter is calculated as $\theta_{ML}$. In the aforementioned continuous mixture HMM method, the sample data x of Eq. (3) corresponds to the feature parameter vector data time-sequence, $x_1, x_2, \ldots$, of the speech data that is actually observed, and the parameter θ is the HMM parameters (the state transition probability $a_{ij}$, the weighting coefficient $w_{jk}$ of the output density distribution function, the mean vector $\mu_{jk}$ of the Gaussian distribution and the covariance matrix $\sigma_{jk}$) of each phoneme.

In contrast to the above, on the assumption that the model parameter θ to be estimated follows a prior distribution g(θ), that is, there is a prior constraint on the parameter θ, the maximum a posteriori estimation method estimates the model parameter θ which maximizes the a posteriori probability that the sample value x is observed under the prior distribution g(θ). Letting the estimated value of the model parameter be represented by $\theta_{MA}$, its mathematical expression is as follows:

$$\theta_{MA} = \text{argmax } f(x|\theta)g(\theta) \tag{4}$$

In the case of the continuous mixture HMM in which only the output density distribution $b_k$ highly sensitive to the HMM likelihood calculation is the object of estimation and the output density distribution is provided as the Gaussian distribution, the mean vector $\mu_{jk}$ and the variance $\sigma_{jk}$ are the objects of adaptation training. On the other hand, in the case of applying the maximum a posteriori estimation to the adaptation training of phoneme models in the speaker adaptation, it is a prerequisite that the amount of speech data for the adaptation training is small. The covariance matrix $\sigma_{jk}$, which is one of the HMM parameters, indicates a variation from the mean vector $\mu_{jk}$, and when the amount of speech data is small, it does not always represent the variation of the speech. Hence, it is considered that the estimation of all the HMM parameters would rather impair the estimation accuracy of each parameter. Accordingly, this embodiment will be described in connection with the adaptation training with only the mean vector $\mu_{jk}$ which can be expected to be effective by a simple calculation procedure. Let the output density distribution of a certain phoneme in the reference phoneme model set RPMS be represented by $$\sum_{k=1}^{3} w_k N(x|\mu_k, \sigma_k)$$

as mentioned previously and the mean vector of the output density distribution to be estimated by the adaptation training be represented by $\mu_k^{MA}$ (k=1, 2, 3). Assuming that the prior distribution g(θ) of the parameter $\mu_k^{MA}$ is a Gaussian distribution $N(\mu_k, |1/\alpha_k|\sigma_k)$ based on the mean vector $\mu_k$ and variance $\sigma_k$ of the reference phoneme model which is an initial model of the adaptation training, the mean vector estimation equation by the maximum a posteriori estimation method according to the aforementioned prior art literatures is as follows:

$$\mu_k^{MA} = (\alpha_k \mu_k + \Sigma c_{kt} x_t)/(\alpha_k + c_{kt}) \tag{5}$$

$$c_{kt} = \frac{w_k N(x_t|\mu_k, \sigma_k)}{\sum_{k=1}^{3} w_k N(x_t|\mu_k, \sigma_k)}$$

where Σ indicates the summation from t=1 to $m_k$, $m_k$ being the number of pieces of sample data x.

For example, in the case of estimating the mean vector of the phoneme models of "u" from the speech data of the word "urayamashii" for adaptation training, since the speech data period of the phoneme "u" is the frame period from the 11th to 20th frame as shown in FIG. 5, sample data is the feature parameter data $x_{11}, x_{12}, \ldots, x_{20}$ and the number of sample data is $m_k$=10. Incidentally, the parameter $\alpha_k$ is an adaptation parameter, which controls the uncertainty of the mean vector to be estimated in the prior distribution g(θ). As this parameter approaches zero, the variance of the prior distribution increases and then the uncertainty of the mean vector increases, whereas when the value of the parameter increases, the variance decreases and then the uncertainty decreases accordingly. Furthermore, $c_{kt}$ indicates the proportion of a k-th Gaussian distribution of the output density distribution (the weighted summation of respective Gaussian distributions) to the output density distribution in the sample data $x_t$ at time t.

According to the estimation equation for the mean vector $\mu_k^{MA}$, it is necessary, for the estimation with the adaptation training data TD, that the mean vector $\mu_k$ of the prior distribution g(θ)=N($\mu_k$,|1/$\alpha_k$|$\sigma_k$), the sample data $x_t$ and the weighting coefficient $c_{kt}$ of the sample data $x_t$ be calculated in advance. As the mean vector of the prior distribution, the mean vector of the reference phoneme models RPM is used. Since the sample data $x_t$ corresponds to the feature parameter data of each frame of the speech data TS for adaptation training, the feature parameter data of the speech period corresponding to each phoneme model obtained in the Viterbi segmentation 42 needs only to be used. The parameter $c_{kt}$ is obtained by calculating the ratio between the value of each Gaussian distribution function of each output density distribution with respect to the sample data $x_t$ and the value of the output density distribution obtained by the weighted summation of the Gaussian distributions, in the process of calculating the likelihood of the model for the adaptation training data TD in the Viterbi segmentation step 42. This sequence of procedures corresponds to the mean vector estimation step 43 in FIG. 4.

For the models of the ten kinds of phonemes contained in the adaptation training data TD, the mean vector $\mu_k^{MA}$ that maximizes the a posteriori probability is calculated for each Gaussian distribution of each output density distribution of each phoneme model. The parameter $\alpha_k$ which controls the variance of the prior distribution g(θ) is calculated experimentally so that phoneme models which are adaptive trained provide the maximum likelihood for the speech data of the corresponding phonemes in the adaptation training data; alternatively, a deviation of the sample data in the prior distribution, which contributes to the estimation of the mean vector $\mu_k$, is calculated and the value of the parameter is set on the basis of this deviation. In the latter case, the mean vector $\mu_k$ is estimated by an iterative procedure wherein the model used for the Viterbi segmentation is replaced with a model having the estimated mean vector and the Viterbi segmentation is carried out to estimate the mean vector. In this instance, upon each iteration, the deviation of the sample data in the prior distribution is calculated and the parameter $\alpha_k$ is set in accordance with the calculated value of the deviation.

With the above procedure, the mean vector adaptation training step 43 using the maximum a posteriori estimation is finished, that is, the extraction of the mean vector ends. In the above example, since only ten kinds of phonemes are contained in the adaptation training data, the phoneme models trained for adaptation are limited to the ten kinds of phonemes. The obtained adapted phoneme models APM are stored as an adapted phoneme model group APMG. The reference phoneme model set RPMS contains many other phoneme models, and their adaptation is also needed to implement the speaker adaptation. Since no adaptation training data corresponding to them is available, however, the ten kinds of phoneme models APM and all the reference phoneme models RPM are used to estimate adapted models of such untrained phoneme models in a step 45. This estimation is carried out using the vector field smoothing method which is another feature of the method according to the present invention.

Figure 6:
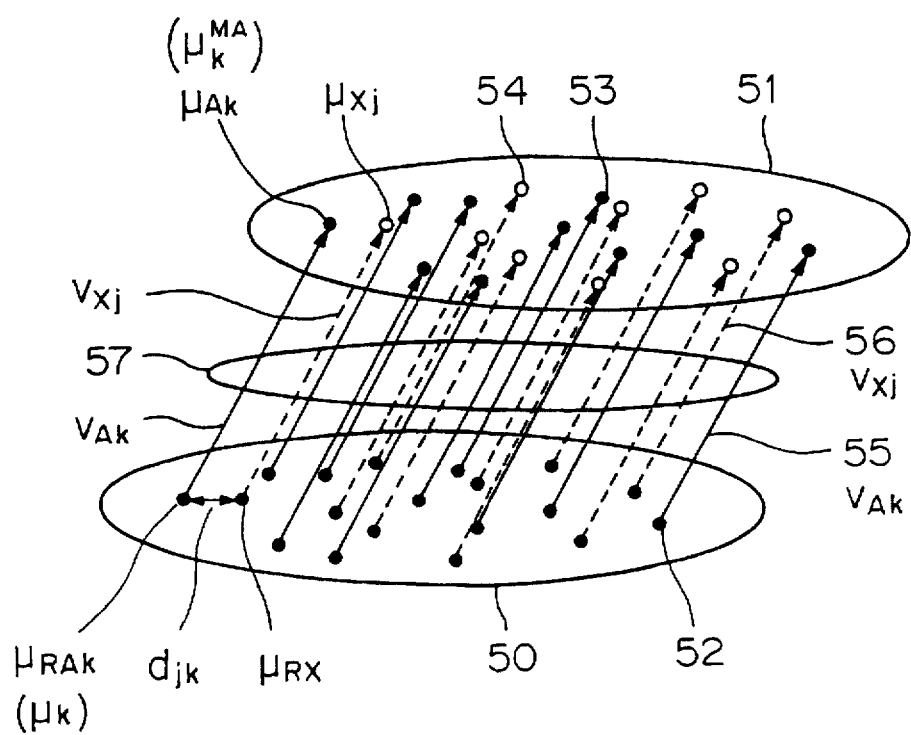
FIG. 6 is a diagram showing, by way of example, the relationships among mean vectors of a reference model set and an adapted model set and transfer vectors, for explaining the principles of the vector field smoothing scheme.

Now, the estimation of the untrained phoneme models through the use of the vector field smoothing method in step 45 and the smoothing procedure in step 46 will be described on the basis of mathematical representations. FIG. 6 shows the principles of the vector field smoothing method. In FIG. 6, reference numeral 50 denotes a set of mean vectors $\mu_{Rk}$ of respective phoneme models RPM in the set RPMS of reference phoneme models which are initial models for adaptation, and 51 denotes a set of mean vectors of adapted versions of all phoneme models, that is, a set of mean vectors of respective adapted phoneme models APM in the adapted phoneme model set APMS. The mean vector of each model in the reference phoneme model set RPMS is indicated by the black circle 52. The mean vectors of the adapted phoneme models in the set 51 are grouped into two; one is a group of mean vectors 53 (indicated by black circles) of phoneme models trained with training speech data and the other is a group of mean vectors 54 (indicated by white circles) of phoneme models estimated by the vector field smoothing method. The former group is obtained as the mean vector of the adapted phoneme model group APMG obtained by the maximum a posteriori estimation. In the vector field smoothing method, it is assumed that the mean vectors 52 of the reference phoneme model set RPMS are transferred, by the adaptation, to the mean vectors 53 of the adapted phoneme model set APMS over the acoustic parameter space. The difference vectors between the corresponding mean vectors of the two phoneme model sets RPMS and APMS represent transfer vectors. The solid-lined transfer vector 55 is a vector obtained from the mean vector 53 trained for adaptation, and the broken-lined vector 56 is a vector left untrained for adaptation and estimated through the interpolation procedure of the vector field smoothing method. In a transfer vector field 57 formed by these transfer vectors 55 and 56, they bear nearly a parallel positional relationship.

In this embodiment, the adapted phoneme model set, that is, the mean vector set APMS, is a set of mean vectors for all adapted phoneme models desired to finally obtain, and the mean vectors of this set APMS, indicated by the black circles 53, correspond to the mean vectors of the ten kinds of phoneme models trained for adaptation by the maximum a posteriori estimation. Hence, the mean vectors of the mean vector set APMS, indicated by the white circles 54, are the objects of estimation by the vector field smoothing method.

A description will be given of the equation for the estimation of mean vectors of unadapted phoneme models (the mean vectors indicated by the white circles 54 in FIG. 6) by the vector field smoothing method. Let the set of the mean vectors 52 of the reference phoneme models RPM be represented by $R=\{\mu_{Rk}|k=1, 2, \ldots M_R\}$ and let the set of those of the mean vectors of the adapted phoneme models which are mean vectors adapted through adaptation training (the vectors indicated by the black circles 53) be represented by $A=\{\mu_{Ak}|k=1, 2, \ldots MA\}$ and the set of the unadapted mean vectors (indicated by the white circles 54) by $X=\{\mu_{Xk}|k=1, 2, \ldots M_X\}$. Further, letting subsets of the set R corresponding to the sets A and X, respectively, be represented by $$RA=\{\mu_{RAk}|k=1, 2, \ldots M_A\}$$

$$RX=\{\mu_{RXk}|k=1, 2, \ldots M_X\}$$

RA and RX respectively indicate a set of mean vectors of reference phoneme vectors RPM prior to the adaptation training which correspond to the adapted phoneme models APM and a set of mean vectors of untrained reference phoneme models for which no training data is available. The numbers of mean vectors in the respective sets are equal to the numbers of vectors in the sets A and X; $M_A+M_A=M_R$. The transfer vector $V_{Ak}$ is calculated between the corresponding mean vectors of the sets A and RA, and is given by $$V_{Ak}=\mu_{Ak}-\mu_{RAk} (k=1, 2, \ldots, M_A) \qquad (6)$$

A transfer vector $V_{Xj}$ corresponding to the mean vector $\mu_{Xj}$ of the unadapted phoneme models is estimated through the weighted interpolation of the transfer vector $V_{Ak}$ corresponding to the mean vector $\mu_{Ak}$ trained for adaptation, and the transfer vector $V_{Xj}$ thus obtained by estimation is added to the mean vector $\mu_{RXj}$ of the corresponding reference phoneme model to calculate the mean vector $\mu_{Xj}$ of the unadapted phoneme models. A weighting coefficient $\omega_{kj}$ in the weighted interpolation of the transfer vector $V_{Ak}$ is determined in accordance with a distance $d_{jk}$ in the acoustic parameter space between the mean vector $\mu_{RXj}$ of the reference phoneme models corresponding to the mean vector $\mu_{Xj}$ to be estimated by interpolation and the mean vector $\mu_{RAk}$ of the reference phoneme models corresponding to the mean vector $\mu_{Ak}$ trained for adaptation. Now, the distance $d_{jk}$ between the given mean vector $\mu_{RXj}$ in the set RX and the given mean vector $\mu_{RAk}$ in the set RA is defined by the following equation:

$$d_{jk}=D(\mu_{RXj}, \mu_{RAj})$$

As the distance function D, there is available a Mahalanobis distance which is often used as a statistic-mathematical distance. In the case of estimating the transfer vector $v_{xj}$ for the mean vector $\mu_{RXj}$ through interpolation, a fuzzy membership function or Gaussian window function is used as the weighting coefficient $\omega_{jk}$ for the transfer vector $v_{Ak}$ of the mean vector $\mu_{RAk}$ in the set RA. These functions are expressed as follows:

$$\omega_{jk} = 1/\left\{\sum_{k \in RA} (d_{jk}/d_{ji})^{1/(f-1)}\right\} : \text{fuzzy membership function}$$

$\omega_{jk}=\exp\{-d_{jk}/f\}$: Gaussian window function

Here, the parameter f is smoothing coefficient (coefficient for arranging the vectors in the same direction); in the case of the fuzzy membership function, it is referred to also as fuzziness. In the case of the fuzzy membership function, when the distance $d_{jk}$ is zero, the corresponding weighting coefficient $\omega_{jk}$ is set to 1. The weighting coefficient $\omega_{jk}$ thus obtained is used to calculate each mean vector of the unadapted phoneme model in the set X as follows:

$$\mu_{Xj} = \mu_{RXj} + \left\{ \sum_{k \in RA} \omega_{jk} V_{Ak} \right\} / \left\{ \sum_{k \in RA} \omega_{jk} \right\} \quad (7)$$

The set of phoneme models having the mean vectors $\mu_{Xj}$ thus estimated for unadapted reference phoneme models in the mean vector estimation step 45 is used as the adapted phoneme model set APMS for speech recognition in combination with the aforementioned set of adapted phoneme models adapted using training data by the maximum a posteriori estimation.

Incidentally, in such a procedure as described above, by estimating the mean vector $\mu_{Xj}$ of the adapted phoneme model corresponding to an unadapted reference phoneme model through interpolation and by including the mean vector $\mu_{Ak}$ obtained through adaptation training by the maximum a posteriori estimation, the mean vector $\mu_{Rk}$ of the adapted model for every phoneme model in the reference phoneme model set is estimated. However, the mean vectors $\mu_{Ak}$ estimated by the maximum a posteriori estimation in step 43 do not always satisfy the condition of parallel transfer vectors which is the assumption of the vector field smoothing estimation method in step 45. To meet this condition, it is also possible that a set of adapted phoneme models, which have mean vectors modified by smoothing the transfer vectors for the mean vectors $\mu_{Ak}$, that is, by arranging the transfer vectors in the same direction, by the equation (8) later, is used as the adapted phoneme model set APMS in combination with the set of adapted phoneme models estimated through interpolation by the vector field smoothing method. The procedure in this case is carried out in a mean vector smoothing step 46 in FIG. 4. Letting two arbitrary mean vectors in the set RA of mean vectors of the reference phoneme models corresponding to the mean vectors of adapted phoneme models be represented by $\mu_{RAk}$ and $\mu_{RAi}$, respectively, the distance $d_{ki}$ between the mean vectors which is used to calculate the weighting coefficient $\omega_{ki}$ is represented by $d_{ki} = D(\mu_{RAk}, \mu_{RAi})$. The weighting coefficient $\omega_{ki}$ used in this instance is obtained by the fuzzy membership function or Gaussian window function as in the case of the interpolation. The calculation for smoothing the mean vectors $\mu_{Ak}^{c}$ trained for adaptation is made by the following equation:

$$\mu_{Ak}^{c} = \mu_{RAk} + \left\{ \sum_{i \in RA} \omega_{ki} V_{Ai} \right\} / \left\{ \sum_{i \in RA} \omega_{ki} \right\} \quad (8)$$

where the superscript c indicates modification by smoothing. In this way, the mean vectors $\mu_{Ak}$ of all the adapted phoneme models in the set A are respectively modified to obtain modified mean vectors $\mu_{Ak}^{c}$.

With the procedures described above, it is possible to implement the speaker adaptation using the combination of the maximum a posteriori estimation method and the vector field smoothing method. In this way, the adapted model set APMS is provided as a combination of modified adapted models obtained by smoothing the adapted models created through the maximum a posteriori estimation using the vector field smoothing method and adapted models obtained through interpolation by the vector field smoothing method using adapted models produced by the maximum a posteriori estimation and the reference phoneme models which are initial modes for adaptation. As for the other parameters of each adapted model, except the mean vector, such as the state transition probability, the weighting coefficient of the output density distribution function and the covariance matrix, the same parameter values of the corresponding reference phoneme models are used.

Figure 7:
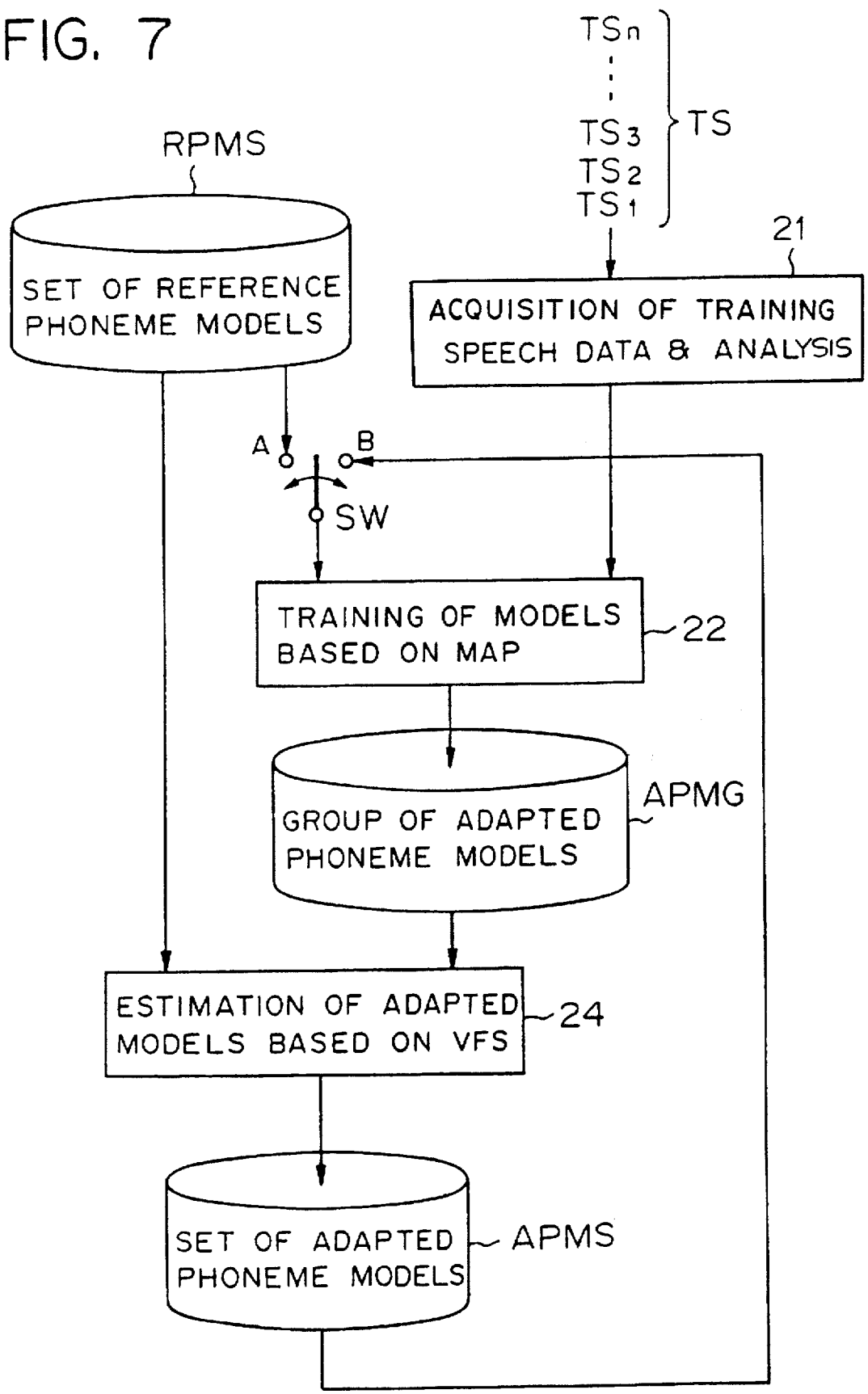
FIG. 7 is a flowchart showing the procedure of an embodiment of the present invention which is designed to permit additional training.

FIG. 7 illustrates the procedure of incremental speaker adaptation processing in accordance with another embodiment of the present invention. There are prepared in advance a set RPMS of speaker-independent reference phoneme models. The main processings of the adaptation training scheme in this embodiment are step 22 by the maximum a posteriori estimations and step 24 by the vector field smoothing, as is the case with the FIG. 2 embodiment. Upon each input of preknown speech data for training, the set APMS of phoneme models adapted through the adaptation training by this invention method is obtained. The input training speech data sequence TS is composed of a plurality of data $TS_1, TS_2, \ldots$, which are input in a sequential order. In the adaptation processing using the first training speech data $TS_1$, the switch SW is connected to the side A, supplying the reference phoneme models RPM of the set RPMS to the maximum a posteriori estimation step 22. In the adaptation processing for the second and subsequent training speech data, the switch SW is connected to side B, supplying the adapted phoneme models APM of the set APMS to the maximum a posteriori estimation step 22. Accordingly, the phoneme models to be adapted, which are used in step 22 for the second and subsequent training speech data $TS_n$, are the adapted phoneme models in the set APMS obtained by the previous adaptation processing.

In the maximum a posteriori estimation processing 22, models of only phonemes contained in the training speech data $TS_n$ are trained and the phoneme models adapted until then by the maximum a posteriori estimation step 22 in each adaptation processing are stored as the set TPMS. For example, in the case of incremental adaptation processing with two training speech data $TS_1$ and $TS_2$, letting it be assumed that, for example, phonemes "k" and "p" are trained with the data $TS_1$ in first adaptation processing and phonemes "k" and "s" with the data $TS_2$ in second adaptation processing, adapted phoneme models after training, which are stored in the set TPMS by the first maximum a posteriori estimation processing, are models of the phonemes "k" and "p"; and adapted phoneme models after training, which are stored in the set TPMS after the second maximum a posteriori estimation processing with the adapted model set APMS obtained by the first adaptation processing, are a model of the phoneme "s" trained for the first time in the second adaptation processing, a model of the phoneme "k" trained again in the second adaptation processing, and a model of the phoneme "p" trained in the first adaptation processing.

Figure 4:
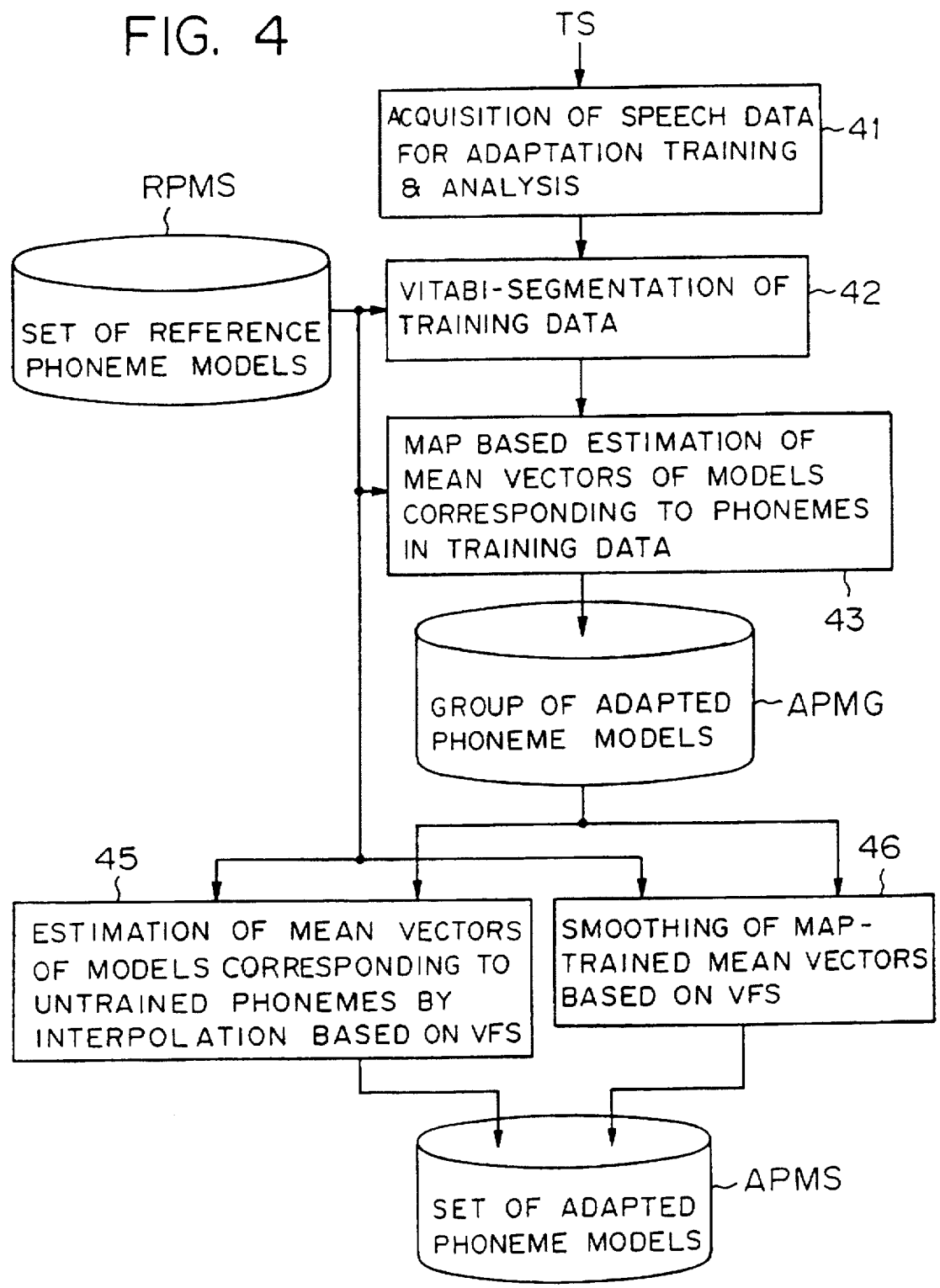
FIG. 4 is a flowchart showing a detailed procedure for the estimation of a mean vector in an embodiment of a speaker adaptation employing the method of the present invention.

The details of the vector field smoothing processing 24 are the same as those of the processing in step 45 in FIG. 4. That is, transfer vectors are determined between the trained adapted phoneme models stored in the set TPMS by the maximum a posteriori estimation processing 22 carried out prior to the current adaptation processing and the corresponding models in the reference phoneme model set RPMS; phoneme models left untrained and unstored by the maximum a posteriori estimation processing 22, that is, untrained phoneme models not yet stored in the set TPMS, are estimated through the interpolation procedure using the above-mentioned transfer vectors. As is the case with the processing 46 in FIG. 4, the trained models stored in the set TPMS by the maximum a posteriori estimation processing 22 are, if necessary, subjected to the smoothing procedure by the vector field smoothing processing 24 to correct their estimation errors.

The adapted phoneme models obtained by the adaptation processing for every input training speech data are held as an updated set APMS and can be used as the latest adapted models prior to the adaptation processing for each input training speech data. Hence, a speech recognition system with such an adaptation processing function permits speech recognition with the most recently updated adapted models at all times. On this account, while being used by a user, the system improves its recognition performance and offers enhanced speech recognition performance to the user.

As described above, according to the FIG. 7 embodiment, upon first input of training speech data, one cycle of the incremental adaptation processing is carried out which is a combination of the maximum a posteriori estimation and the vector field smoothing technique. In the adaptation processing for the subsequent input of training speech data, the maximum a posteriori estimation step 22 is carried out for adapted phoneme models obtained from the adapted model sets APMS stored in the previous processing. As for the parameters of each adapted model other than the mean vector, such as the state transition probability, the weighting coefficient of the output density distribution function and the covariance matrix, the same parameter values of the corresponding reference phoneme models are used.

Moreover, as described above, in the adaptation processing using the second training speech data, the adapted models in the set APMS obtained by the previous adaptation processing are used as models to be adapted in the maximum a posteriori estimation, but in the vector field smoothing step 24, initial models of the reference models of the set RPMS are used, not the adapted models of the set APMS.

Figure 8:
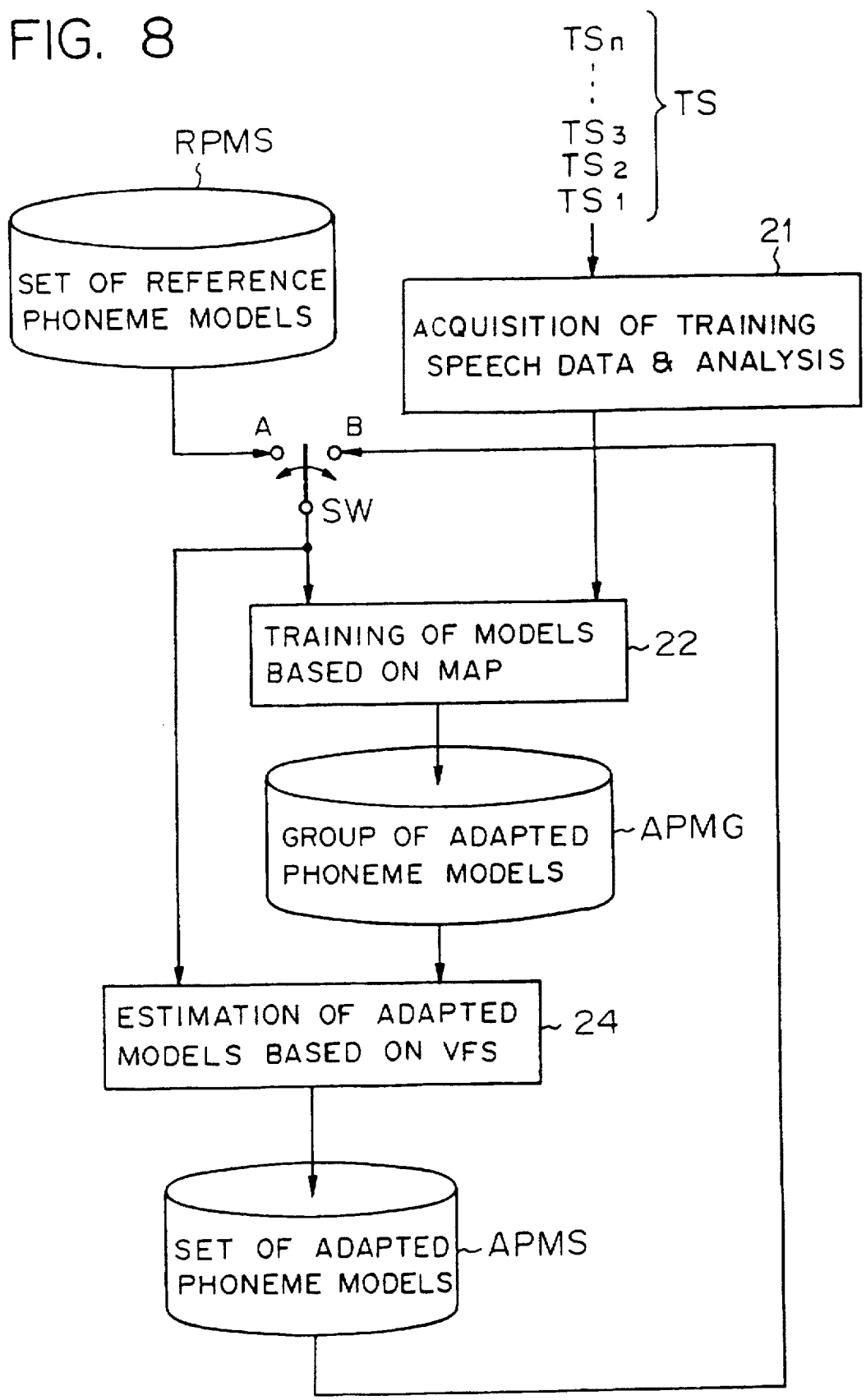
FIG. 8 is a flowchart showing the procedure of another embodiment of the present invention which is designed to permit additional training.

In an embodiment of FIG. 8, for the first training speech data $TS_1$, the reference phoneme model set RPMS is used as the object of training to perform the adaptation processing 22 by the maximum a posteriori estimation and the reference phoneme model set RPMS is used to perform the interpolation procedure 24 by the vector field smoothing method as is the case with the FIG. 7 embodiment. For the second and subsequent new training speech data $TS_2$, $TS_3$, . . . , however, the adapted phoneme model set APMS is used as an updated reference phoneme model set, instead of the reference phoneme model set RPMS, to perform the adaptation processing by the maximum a posteriori estimation and the interpolation procedure by the vector field smoothing method. In any adaptation training, all adapted phoneme model groups APMG are updated with the adapted phoneme models obtained by the maximum a posteriori estimation.

Figure 9:
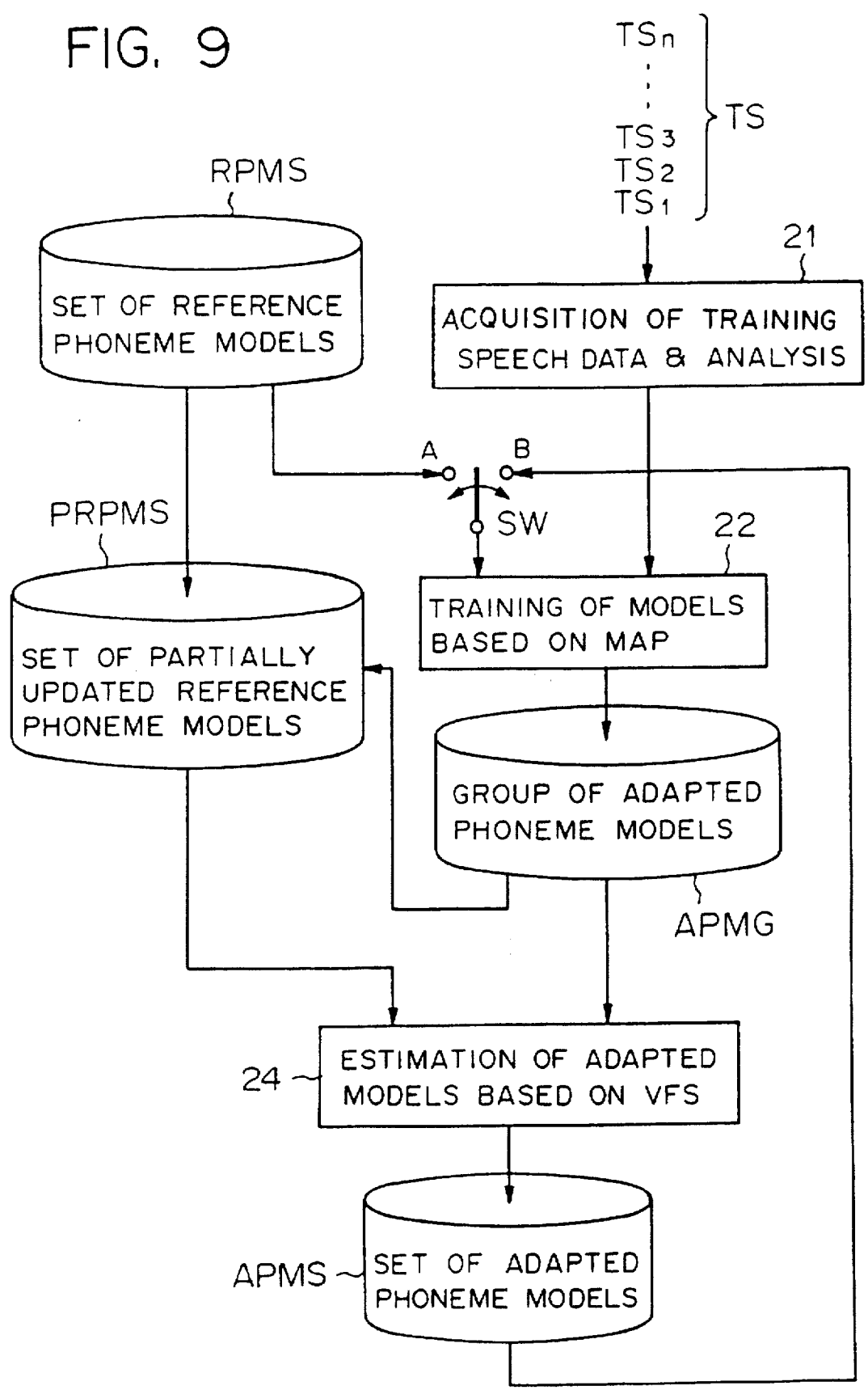
FIG. 9 is a flowchart showing the procedure of another embodiment of the present invention which is designed to permit additional training.

FIG. 9 illustrates a modified form of the FIG. 7 embodiment. In this example, there is provided a partially updated reference phoneme model set PRPMS in which the reference phoneme set RPMS is provided as an initial set. As in the FIG. 7 embodiment, upon input of the first training speech data $TS_1$, the adaptation processing 22 by the maximum a posteriori estimation is carried out for the reference phoneme models in the reference phoneme model set RPMS, and the vector field smoothing processing 24 performs the interpolation procedure using the reference phoneme model set RPMS which is the initial set of the partially updated reference phoneme model set PRPMS; the adapted phoneme models thus estimated are combined with the adapted phoneme model group APMG into the adapted phoneme model set APMS. In the FIG. 9 embodiment, after the processing in step 24, the adapted phoneme models APM are used to update the corresponding reference phoneme models in the partially updated reference phoneme model set PRPMS which are to be trained. Thereafter, upon input of each of new training speech data $TS_2$, $TS_3$, . . . , the previously adapted phoneme models set APMS is used as an updated reference phoneme model set to adapt the updated reference phoneme models to be trained, in the maximum a posteriori estimation processing step 22, then the adapted phoneme models thus obtained are used to update all models of the adapted phoneme model group APMG, and in the vector field smoothing step 24 the partially updated reference phoneme model group APMG is used to perform the interpolation procedure. After this, those models in the partially updated reference phoneme model set PRPMS which are to be trained are updated by the adapted phoneme model group APMG.

Figure 10:
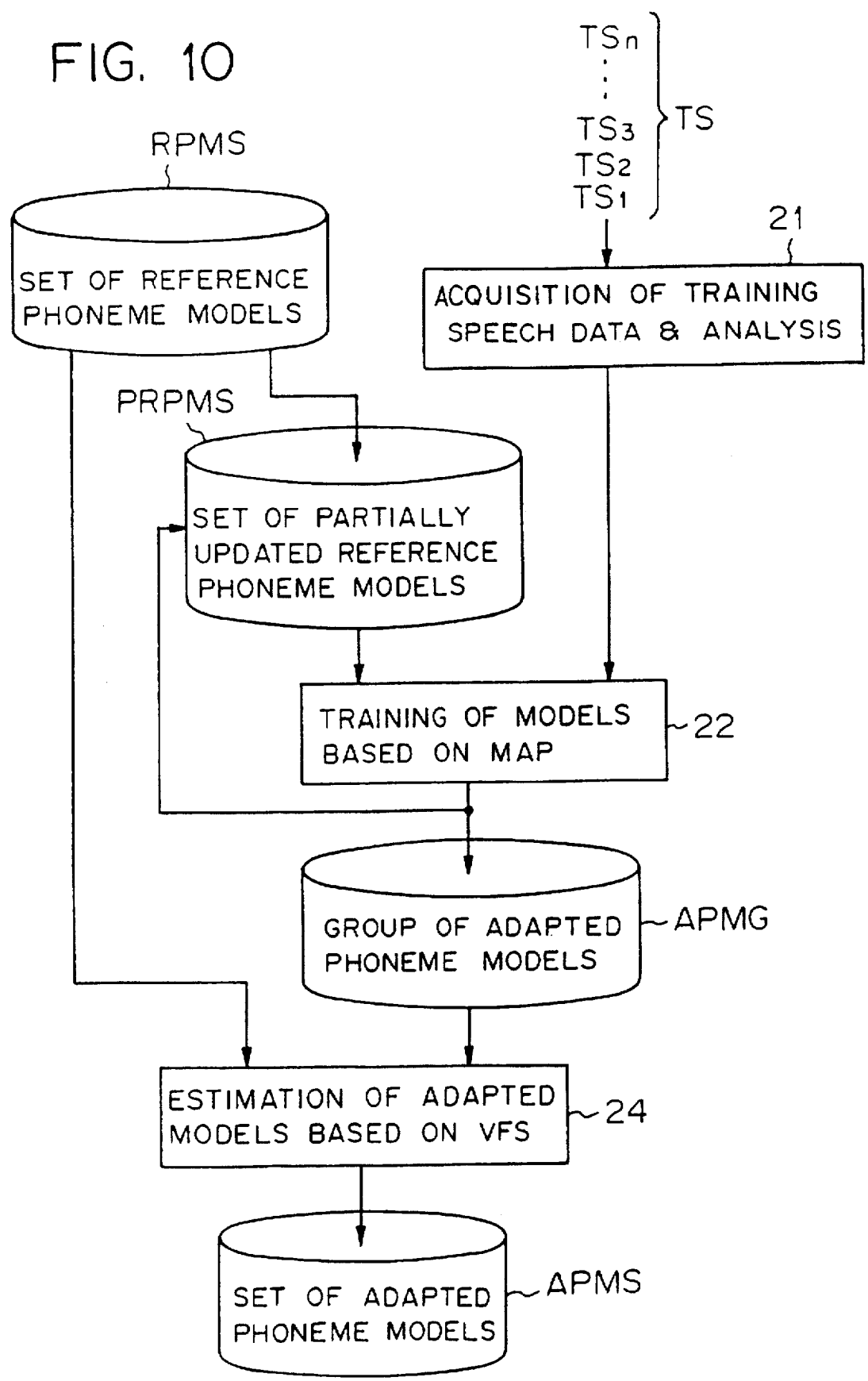
FIG. 10 is a flowchart showing the procedure of another embodiment of the present invention which is designed to permit additional training.

In an embodiment of FIG. 10, the adaptation processing is carried out using the partially updated reference phoneme model set PRPMS on the basis of the maximum a posteriori estimation processing 22. The reference phoneme model set RPMS is provided as an initial model set to the partially updated reference phoneme model set PRPMS. Upon input of the first training speech data $TS_1$, those reference phoneme models to be trained in the partially updated reference phoneme model set PRPMS which correspond to the phoneme of the training speech data $TS_1$ are adapted in the maximum a posteriori estimation step 22, and the thus obtained adapted phoneme models are stored in the group APMG. The adapted phoneme models thus obtained by the maximum a posteriori estimation are used to update those reference phoneme models in the partially updated reference phoneme model set PRPMS which are to be trained. In the vector field smoothing step 24, as is the case with the FIG. 7 embodiment, adapted phoneme models of the group APMG obtained by training are used to estimate, through interpolation, those adapted reference phoneme models in the original reference phoneme model group RPMS which correspond to untrained reference phoneme models.

Upon input of the second training speech data $TS_2$, those reference phoneme models in the partially updated reference phoneme model set PRPMS updated by the previous adaptation processing which have newly become objects of training are adapted by the maximum a posteriori estimation processing in step 22, then the thus adapted phoneme models are added to the group APMG, and at the same time, such adapted phoneme models are used to update the corresponding models in the partially updated reference phoneme models set PRPMS. For the subsequent input training speech data, the same processing as described above is carried out. In this way, for each adaptation to the input training speech data, the reference phoneme models in the partially updated reference phoneme model set PRPMS are updated with models adapted by the maximum a posteriori estimation processing.

Figure 11:
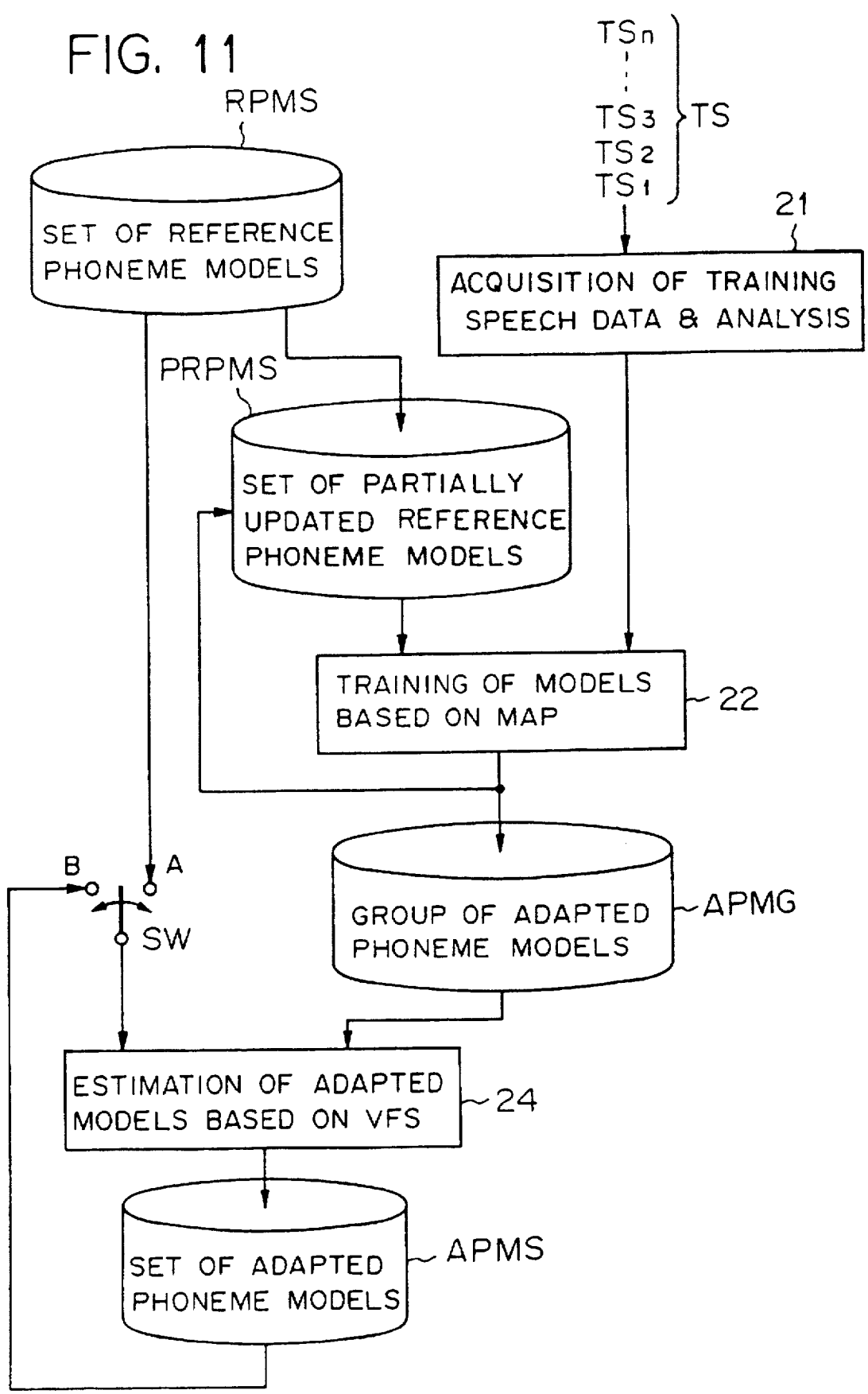
FIG. 11 is a flowchart showing the procedure of another embodiment of the present invention which is designed to permit additional training.

FIG. 11 illustrates a modified form of the FIG. 10 embodiment, which uses the adapted phoneme model set APMS as an updated reference phoneme model set to perform the interpolation procedure by the vector field smoothing step 24 in the adaptation training with second and subsequent training speech data, instead of using the reference phoneme model set RPMS as in the FIG. 10 embodiment. In this instance, all models of the adapted phoneme model group APMG are updated with the adapted phoneme models obtained by the maximum a posteriori estimation processing 22, while at the same time the reference phoneme models in the partially updated reference phoneme model set PRPMS which are objects of training are also updated. The other processing is the same as in the FIG. 10 embodiment. That is, in the adaptation training with the first training speech data $TS_1$, the switch SW is connected to the side A; reference phoneme models to be trained in the reference phoneme model set provided as the initial set to the partially updated reference phoneme model set PRPMS are adapted to the training data through the adaptation processing 22 by the maximum a posteriori estimation scheme, then the thus adapted phoneme models are stored as the adapted phoneme model group APMG, and at the same time, reference phoneme models to be trained in the partially updated reference phoneme model set PRPMS are updated. The adapted phoneme models corresponding to untrained reference phoneme models in the reference phoneme model set RPMS are estimated through the interpolation procedure 24 by the vector field smoothing method using the adapted phoneme model group APMG. The estimated adapted phoneme models are combined with the adapted phoneme model group APMG into the adapted phoneme model set APMS. Incidentally, the partially updated reference phoneme model set PRPMS may be updated using the adapted phoneme model group APMG in the step 24 as is the case with the FIG. 9 embodiment.

Figure 12:
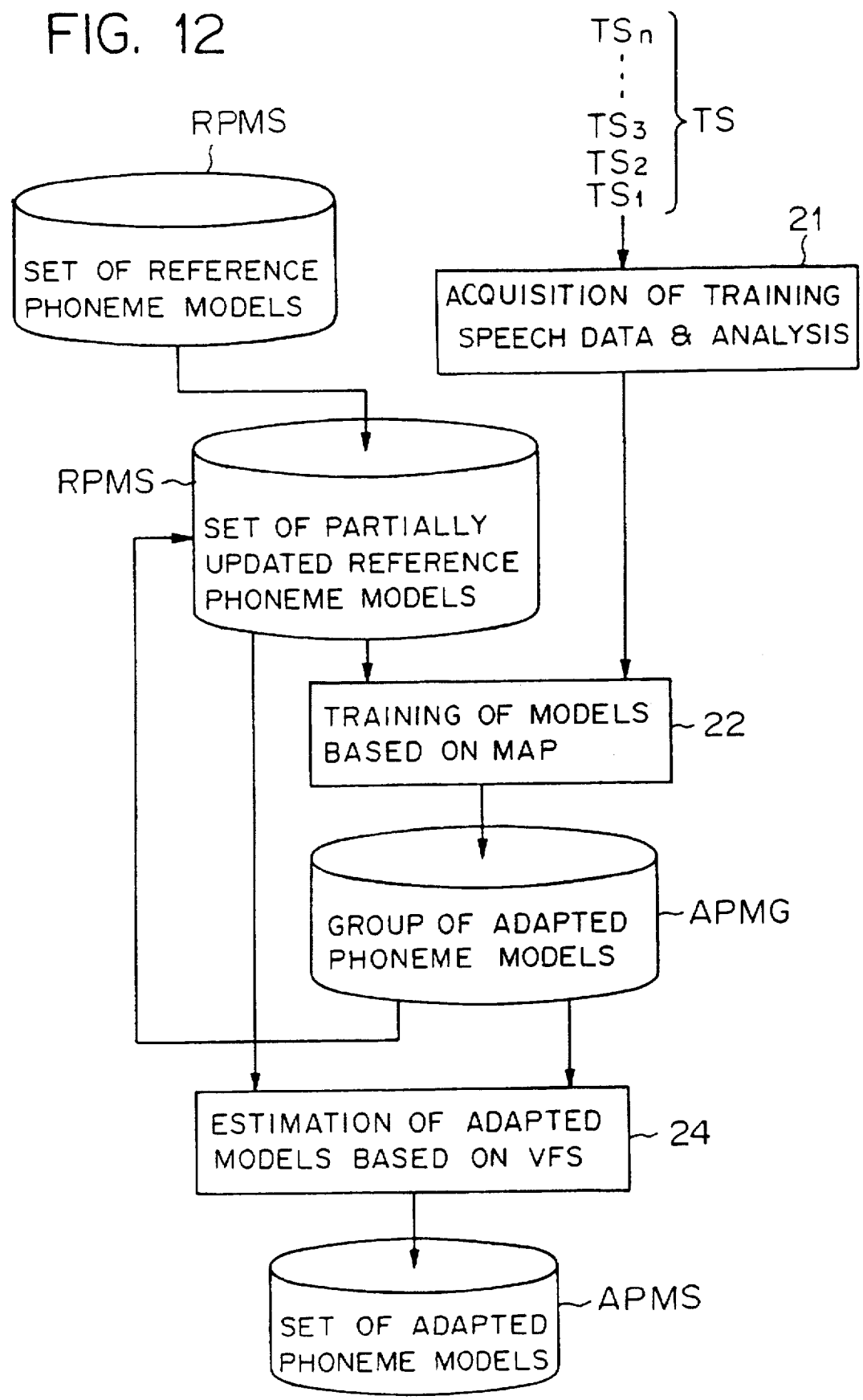
FIG. 12 is a flowchart showing the procedure of still another embodiment of the present invention which is designed to permit additional training.

FIG. 12 illustrates another modification of the FIG. 10 embodiment, which obtains adapted phoneme models through the interpolation procedure by the vector field smoothing method using the partially updated reference phoneme model set PRPMS, instead of using the reference phoneme model set RPMS as in the FIG. 10 embodiment. In this embodiment, the adapted phoneme model group APMG, which is obtained by the maximum a posteriori estimation for the first training speech data $TS_1$ as in the FIG. 10 embodiment, is used to adapt, through the interpolation procedure 24 by the vector field smoothing method, untrained reference phoneme models in the partially updated reference phoneme model set PRPMS supplied with the reference phoneme model set RPMS as the initial set. Thus, the adapted phoneme models are combined with the adapted phoneme model group APMG into the updated adapted phoneme model set APMS, and reference phoneme models to be trained in the partially updated reference phoneme model set PRPMS are updated with the adapted phoneme model group APMG.

Thereafter, upon each input of new training speech data, reference phoneme models to be trained in the partially updated reference phoneme model set PRPMS are adapted through the adaptation processing 22 by the maximum a posteriori estimation to obtain adapted phoneme models, with which all the models in the adapted phoneme model group APMG are updated. The interpolation processing 24 by the vector field smoothing method is carried out using the partially updated phoneme model set PRPMS and the adapted phoneme model group APMG. The adapted phoneme models obtained by the interpolation procedure and the adapted phoneme model group APMG are combined into the updated adapted phoneme model set APMS, and the adapted phoneme model group APMG is used to update the reference phoneme models to be trained in the partially updated reference phoneme model set PRPMS.

The embodiments of FIGS. 8, 9, 10, 11 and 12 may also employ a configuration in which, as described previously with reference to FIG. 4, the adapted phoneme models of the adapted phoneme model groups APMG used as part of the adapted phoneme model set APMS, are modified by the vector field smoothing method as in the step 46 in FIG. 4 and the group of adapted phoneme models thus modified is used as the adapted phoneme model set APMS in combination with the adapted phoneme models estimated through the interpolation procedure by the vector field smoothing method.

While the present invention has been described as being applied to speech recognition, the invention is also applicable to the recognition of characters, images and various other patterns.

As will be appreciated from the above, the present invention possesses the advantages listed below.

(a) The conventional maximum likelihood estimation scheme performs the adaptation to the model closest to training data, and hence cannot estimate models with high accuracy unless a large amount of training data is used. On this account, the adaptation training by this scheme requires an amount of adaptation training data as large as tens of words to obtain satisfactory estimation accuracy. In contrast to this, the method of the present invention employs the maximum a posteriori estimation scheme which adapts the reference model to the training data utilizing prior information of the reference models, and hence permits reduction of the amount of adaptation training data down to about several words, implementing fast adaptation processing. Moreover, since the information of the reference model is utilized, it is possible to achieve high recognition performance without losing generality.

(b) Since the amount of adaptation training data can be reduced down to several words, forced utterances on users in practical applications of the speech recognition system or facility can be substantially decreased as compared with the prior art—this improves drastically the man-machine interface between users and the system.

(c) The method of the present invention has a general framework for training with a small amount of sample data, and hence can be applied not only to the afore-described adaptation to a speaker but also to the adaptation to speeches influenced by the frequency characteristics of a communication medium such as a microphone or telephone line (including characteristics of telephone) (adaptation to environments) and simultaneous adaptation to environments and speakers. Thus, the present invention is of very wide application.

It will be apparent that many modifications and variations may be effected without departing from the scope of the novel concepts of the present invention.

What is claimed is:

1. A method which modifies a set of prepared reference models through training with input training data to attain adapted models for pattern recognition which fit said training data, comprising the steps:

(a) wherein those reference models to be trained in said set which correspond to training models in said input training data are adapted to said training data by a maximum a posteriori estimation method to obtain a first group of adapted models;

(b) wherein, letting said reference models in said set corresponding to said first group of adapted models be identified as a first group of reference models and the other reference models in said set be identified as a second group of reference models, a second group of adapted models corresponding to said second group of reference models is obtained through interpolation by a vector field smoothing method using the relationship between said first group of adapted models and said first group of reference models corresponding thereto; and (c) wherein said second group of adapted models obtained through said interpolation and said first group of adapted models obtained by said maximum a posteriori estimation method are combined into a set of adapted models for pattern recognition.

2. The method of claim 1, wherein in said step (c) said first group of adapted models obtained by said maximum a posteriori estimation method in said step (a) are modified through a smoothing procedure by said vector field smoothing method to obtain a third group of adapted models, and said third group of adapted models is combined, as said first group of adapted models corresponding to said first group of reference models, with said second group of adapted models into said set of adapted models for pattern recognition.

3. The method of claim 1 or 2, wherein said reference models are continuous mixture hidden Markov models.

4. The method of claim 3, wherein said step (a) includes a step wherein: a statistical parameter of each of a plurality of distribution functions forming an output density distribution function of a model is to be estimated; said statistical parameter to be estimated is obtained by said maximum a posteriori estimation method using, as a control parameter common to all of said plurality of distribution functions of said output density distribution function, a statistical parameter of each prior distribution representing the reliability of said statistical parameter to be estimated; and a model to be trained in said training data is generated using distribution functions each including said statistical parameter obtained by said maximum a posteriori estimation method.

5. The method of claim 3, wherein said step (a) includes a step wherein: a statistical parameter of each of a plurality of distribution functions forming an output density distribution function of a model is to be estimated; said statistical parameter to be estimated is obtained by said maximum a posteriori estimation method using, as a control parameter corresponding to a statistical deviation of said training data for a prior distribution of each distribution function, a statistical parameter of said each prior distribution representing the reliability of said statistical parameter to be estimated; and a model to be trained in said training data is produced using distribution functions each including said statistical parameter obtained by said maximum a posteriori estimation method.

6. The method of claim 4 or 5, wherein said distribution functions are each a Gaussian distribution and said statistical parameter to be estimated is a mean vector of said model.

7. The method of claim 4 or 5, wherein said distribution functions are each a Laplacian distribution and said statistical parameter to be estimated is a mean vector of said model.

8. The method of claim 1 or 2, wherein said vector field smoothing method in said step (b) includes a process for obtaining transfer vectors on the basis of variations of statistical parameters of distribution functions of said first group of adapted models and distribution functions of said first reference models and for determining weighting coefficients of said transfer vectors in accordance with the distributions of said statistical parameters of said distribution functions of said first group of reference models.

9. The method of claim 8, wherein said statistical parameters of said distribution functions are mean vectors of models and said variations of said statistical parameters are each obtained as the difference between said mean vectors of two corresponding models.

10. The method of claim 9, which further comprises a step of calculating said weighting coefficient as a fuzzy membership function.

11. The method of claim 9, which further comprises a step of calculating said weighting coefficient as a Gaussian window function.

12. The method of claim 1, which repeats the following steps (d) through (f) upon each input of new training data after said step (c):

(d) wherein those adapted models to be trained in said adapted model set which correspond to training models in said new training data are re-adapted by said maximum a posteriori estimation method to said new training data and said re-adapted models are added to said first group of adapted models;

(e) wherein, letting reference models in said set corresponding to said first group of adapted models be identified as a first group of reference models and the other reference models in said set be identified as a second group of reference models, a second group of adapted models corresponding to said second group of reference models is obtained through interpolation by said vector field smoothing method using the relationship between said first group of adapted models and said first group of reference models corresponding thereto; and (f) said first group of adapted models obtained by said maximum a posteriori estimation method in said step (d) and said second group of adapted models obtained by said interpolation in said step (e) are combined into a set of updated adapted models for pattern recognition.

13. The method of claim 1, which repeats the following steps (d) through (f) upon each input of new training data after said step (c):

(d) wherein said set of adapted models is regarded as a set of updated reference models, those updated reference models to be trained in said updated reference model set which correspond to said new training data are re-adapted by said maximum a posteriori estimation method using said new training data to obtain re-adapted models, and said first group of adapted models is updated with said re-adapted models;

(e) wherein, letting said updated reference models in said set corresponding to said first group of adapted models be identified as a first group of updated reference models and the other updated reference models in said set of updated reference models be identified as a second group of updated reference models, a second group of adapted models corresponding to said second group of updated reference models is obtained through interpolation by said vector field smoothing method using the relationship between said first group of adapted models and said first group of updated reference models corresponding thereto; and (f) wherein said first group of adapted models obtained by said maximum a posteriori estimation method in said step (d) and said second group of adapted models obtained by said interpolation in said step (e) are combined into a set of updated adapted models for pattern recognition.

14. The method of claim 1, wherein said step (c) includes a step wherein those of reference models of an initial set which correspond to said first adapted model group are updated therewith to form a set of partially updated reference models, and which repeats the following steps (d) through (f) upon each input of new training data after said step (c):

(d) wherein said set of adapted models is regarded as a set of updated reference models, those updated reference models to be trained in said updated reference model set which correspond to said new training data are adapted by said maximum a posteriori estimation method using said new training data to obtain adapted models, and said first group of adapted models are updated with said adapted models;

(e) wherein, letting those partially updated reference models in said partially updated reference model set which correspond to said first group of adapted models be identified as a first group of partially updated reference models and the other partially updated reference models in said partially updated reference model set be identified as a second group of partially updated reference models, a second group of adapted models corresponding to said second group of partially updated reference models is obtained through interpolation by said vector field smoothing method using the relationship between said first group of adapted models and said first group of partially updated reference models corresponding thereto; and (f) wherein those models in said partially updated reference model set which correspond to said first group of adapted models updated in said step (d) are updated therewith, and said first group of adapted models obtained by said maximum a posteriori estimation method and said second group of adapted models by said interpolation in said step (e) are combined into a set of updated adapted models for pattern recognition.

15. The method of any one of claims 12 through 14, wherein said step (f) is a step wherein said first group of adapted models obtained by said maximum a posteriori estimation method in said step (d) is modified through a smoothing procedure by said vector field smoothing method to form a third group of adapted models, and said third group of adapted models is combined, as said first group of adapted models, with said second group of adapted group into said set of adapted models for pattern recognition.

16. The method of any one of claims 12 through 14, wherein said reference models are continuous mixture hidden Markov models.

17. The method of claim 16, wherein said maximum a posteriori estimation method includes a process wherein: a statistical parameter of each of a plurality of distribution functions forming an output density distribution function of a model is to be estimated; said statistical parameter to be estimated is obtained by said maximum a posteriori estimation method using, as a control parameter common to all of said plurality of distribution functions of said output density distribution function, a statistical parameter of each prior distribution representing the reliability of said statistical parameter to be estimated; and a model to be trained in said training data is produced using distribution functions each including said statistical parameter obtained by said maximum a posteriori estimation method.

18. The method of claim 16, wherein said maximum a posteriori estimation method include a process wherein: a statistical parameter of each of a plurality of distribution functions forming an output density distribution function of a model is to be estimated; said statistical parameter to be estimated is obtained by said maximum a posteriori estimation method using, as a control parameter corresponding to a statistical deviation of said training data for a prior distribution of each distribution function, a statistical parameter of said prior distribution representing the reliability of said statistical parameter to be estimated; and a model to be trained in said training data is produced using distribution functions each including said statistical parameter obtained by said maximum a posteriori estimation method.

19. The method of claim 17 or 18, wherein said distribution functions are each a Gaussian distribution and said statistical parameter to be estimated is a mean vector of said model.

20. The method of claim 17 or 18, wherein said distribution functions are each a Laplacian distribution and said statistical parameter to be estimated is a mean vector of said model.

21. The method of claim 17 or 18, wherein said vector field smoothing method in said step (b) includes a process for obtaining transfer vectors on the basis of variations of statistical parameters of distribution functions of said first group of adapted models and distribution functions of said first reference models and for determining weighting coefficients of said transfer vectors in accordance with the distributions of said statistical parameters of said distribution functions of said first group of reference models.

22. The method of claim 21, wherein said statistical parameters of said distribution functions are mean vectors of models and said variations of said statistical parameters are each obtained as the difference between said mean vectors of two corresponding models.

23. The method of claim 22, which further comprises a step of calculating said weighting coefficient as a fuzzy membership function.

24. The method of claim 22, which further comprises a step of calculating said weighting coefficient as a Gaussian window function.

25. The method of claim 1, wherein said step (c) includes a step wherein those of reference models of an initial set which correspond to said first adapted model group are updated therewith to form a set of partially updated reference models, and which repeats the following steps (d) through (f) upon each input of new training data after said step (c):

(d) wherein those reference models to be trained in said partially updated reference model set which correspond to said new training data are adapted by said maximum a posteriori estimation method using said new training data to obtain adapted models, said adapted models are added to said first group of adapted models, and said reference models to be trained in said partially updated reference model set are updated with said adapted models;

(e) wherein, letting reference models of said initial set corresponding to said first group of adapted models be identified as a first group of reference models and the other reference models in said set be identified as a second group of reference models, a second group of adapted models corresponding to said second group of reference models are obtained through interpolation by said vector field smoothing method using the relationship between said first group of adapted models and said first group of reference models corresponding thereto; and (f) wherein said first group of adapted models obtained by said maximum a posteriori estimation method in step (d) and said second group of adapted models obtained by said interpolation in said step (e) are combined into a set of updated adapted models for pattern recognition.

26. The method of claim 1, wherein said step (c) includes a step wherein those of reference models of an initial set which correspond to said first adapted model group are updated therewith to form a set of partially updated reference models, and which repeats the following steps (d) through (f) upon each input of new training data after said step (c):

(d) wherein said set of adapted models is regarded as a set of updated reference models, those updated reference models to be trained in said updated reference model set which correspond to said new training data are adapted by said maximum a posteriori estimation method using said new training data to obtain adapted models, and said first adapted model group and said reference models to be trained in said partially updated reference model set are updated with said adapted models;

(e) wherein, letting those updated reference models in said updated reference model set which correspond to said first group of adapted models be identified as a first group of updated reference models and the other updated reference models in said updated reference model set be identified as a second group of updated reference models, a second group of adapted models corresponding to said second group of updated reference models is obtained through interpolation by said vector field smoothing method using the relationship between said first group of adapted models and said first group of updated reference models corresponding thereto; and (f) wherein said first group of adapted models obtained by said maximum a posteriori estimation method in said step (d) and said second group of adapted models obtained by said interpolation in said step (e) are combined into a set of updated adapted models for pattern recognition.

27. The method of claim 1, wherein said step (c) includes a step wherein those of reference models of an initial set which correspond to said first adapted model group are updated therewith to form a set of partially updated reference models, and which repeats the following steps (d) through (f) upon each input of new training data after said step (c):

(d) wherein those reference models to be trained in said partially updated reference model set which correspond to said new training data are adapted by said maximum a posteriori estimation method using said new training data to obtain adapted models, and said first group of adapted models is updated with said adapted models;

(e) wherein, letting reference models in said partially updated reference model set corresponding to said first group of adapted models be identified as a first group of partially update reference models and the other reference models in said partially updated reference model set be identified as a second group of partially updated reference models, a second group of adapted models corresponding to said second group of partially updated reference models is obtained through interpolation by said vector field smoothing method using the relationship between said first group of adapted models and said first group of partially updated reference models corresponding thereto; and (f) wherein said reference models to be trained in said partially updated reference model set corresponding to said first group of adapted models updated in said step (d) are updated therewith, and said first group of adapted models obtained by said maximum a posteriori estimation method in said step (d) and said second group of adapted models obtained by said interpolation in said step (e) are combined into a set of updated adapted models for pattern recognition.

28. The method of any one of claims 25 through 27, wherein said step (f) is a step wherein said reference models to be trained in said partially updated reference model set are updated with said first group of adapted models obtained by said maximum a posteriori estimation method in said step (d), said first group of adapted models obtained in said step (d) is modified through a smoothing procedure by said vector field smoothing method to form a third group of adapted models, and said third group of adapted models is combined, as said first group of adapted models, with said second group of adapted models into said set of adapted models for pattern recognition.

29. The method of claim 25, 26, or 27, wherein said reference models are continuous mixture hidden Markov models.

30. The method of claim 29, wherein said maximum a posteriori estimation method includes a process wherein: a statistical parameter of each of a plurality of distribution functions forming an output density distribution function of a model is to be estimated; said statistical parameter to be estimated is obtained by said maximum a posteriori estimation method using, as a control parameter common to all of said plurality of distribution functions of said output density distribution function, a statistical parameter of each prior distribution representing the reliability of said statistical parameter to be estimated; and a model to be trained in said training data is produced using distribution functions each including said statistical parameter obtained by said maximum a posteriori estimation method.

31. The method of claim 29, wherein said maximum a posteriori estimation method includes a process wherein: a statistical parameter of each of a plurality of distribution functions forming an output density distribution function of a model is to be estimated; said statistical parameter to be estimated is obtained by said maximum a posteriori estimation method using, as a control parameter corresponding to a statistical deviation of said training data for a prior distribution of each distribution function, a statistical parameter of said prior distribution representing the reliability of said statistical parameter to be estimated; and a model to be trained in said training data is produced using distribution functions each including said statistical parameter obtained by said maximum a posteriori estimation method.

32. The method of claim 30 or 31, wherein said distribution functions are each a Gaussian distribution and said statistical parameter to be estimated is a mean vector of said model.

33. The method of claim 30 or 31, wherein said distribution functions are each a Laplacian distribution and said statistical parameter to be estimated is a mean vector of said model.

34. The method of claim 30 or 31, wherein said vector field smoothing method in said step (b) includes a process for obtaining transfer vectors on the basis of variations of statistical parameters of distribution functions of said first group of adapted models and distribution functions of said first reference models and for determining weighting coefficients of said transfer vectors in accordance with the distributions of said statistical parameters of said distribution functions of said first group of reference models.

35. The method of claim 34, wherein said statistical parameters of said distribution functions are mean vectors of models and said variations of said statistical parameters are each obtained as the difference between said mean vectors of two corresponding models.

36. The method of claim 35, which further comprises a step of calculating said weighting coefficient as a fuzzy membership function.

37. The method of claim 35, which further comprises a step of calculating said weighting coefficient as a Gaussian window function.

* * * * *